(12) United States Patent
Nichols et al.

(10) Patent No.: US 7,829,656 B2
(45) Date of Patent: *Nov. 9, 2010

(54) SOLID PHASE POLYMERIZATION CATALYST SYSTEM

(75) Inventors: Carl Steven Nichols, Waxhaw, NC (US); Tony Clifford Moore, Charlotte, NC (US); Daniel Allen Huenefeld, Atlanta, GA (US)

(73) Assignee: Wellman, Inc., Bay St. Louis, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/351,245

(22) Filed: Jan. 9, 2009

(65) Prior Publication Data

US 2009/0198022 A1 Aug. 6, 2009

Related U.S. Application Data

(63) Continuation of application No. PCT/US2007/073224, filed on Jul. 11, 2007.

(60) Provisional application No. 60/807,038, filed on Jul. 11, 2006.

(51) Int. Cl.
C08G 64/00 (2006.01)
C08G 63/02 (2006.01)

(52) U.S. Cl. .................. 528/308.1; 264/176.1; 264/219; 502/150; 528/271; 528/272

(58) Field of Classification Search .............. 264/176.1, 264/219; 502/150; 528/271, 272, 308.1
See application file for complete search history.

(56) References Cited

U.S. PATENT DOCUMENTS

| | | | |
|---|---|---|---|
| 3,607,354 | A | 9/1971 | Krogh et al. |
| 4,370,302 | A | 1/1983 | Suzuoka et al. |
| 4,408,004 | A | 10/1983 | Pengilly |
| 5,298,650 | A | 3/1994 | Waller et al. |
| 5,410,984 | A | 5/1995 | Pikus et al. |
| 5,440,005 | A | 8/1995 | Pikus |
| 5,454,344 | A | 10/1995 | Pikus et al. |
| 5,497,562 | A | 3/1996 | Pikus |
| 5,523,064 | A | 6/1996 | Schranz |
| 5,532,335 | A | 7/1996 | Kimball et al. |
| 5,610,205 | A | 3/1997 | Yang et al. |
| 5,634,282 | A | 6/1997 | Pikus |
| 5,662,870 | A | 9/1997 | Walsh |
| 5,711,089 | A | 1/1998 | Pikus |
| 5,898,058 | A | 4/1999 | Nichols et al. |
| 5,905,136 | A | 5/1999 | Po et al. |
| 6,180,756 | B1 | 1/2001 | Burch |
| 6,284,866 | B1 | 9/2001 | Schiavone |
| 6,309,718 | B1 | 10/2001 | Sprayberry |
| 6,335,422 | B2 | 1/2002 | Schiavone |
| 6,348,270 | B1 | 2/2002 | Jin et al. |
| 6,417,266 | B1 | 7/2002 | Terado et al. |
| 6,500,890 | B2 | 12/2002 | Edwards et al. |
| 6,503,586 | B1 | 1/2003 | Wu et al. |
| 6,569,991 | B2 | 5/2003 | Nichols et al. |
| 6,573,359 | B2 | 6/2003 | Nichols et al. |
| 6,590,069 | B2 | 7/2003 | Nichols et al. |
| 6,599,596 | B2 | 7/2003 | Nichols et al. |
| 6,649,731 | B2 | 11/2003 | Hori et al. |
| 6,699,545 | B2 | 3/2004 | Parthasarathy |
| 6,710,158 | B2 | 3/2004 | Edwards et al. |
| 6,713,600 | B1 | 3/2004 | Isayev et al. |
| 6,727,306 | B2 | 4/2004 | Edwards et al. |
| 6,767,520 | B2 | 7/2004 | Pikus |
| 6,780,916 | B2 | 8/2004 | Tung et al. |
| 6,803,082 | B2 | 10/2004 | Nichols et al. |
| 7,094,863 | B2 | 8/2006 | Moore et al. |
| 7,129,317 | B2 | 10/2006 | Moore et al. |
| 7,238,770 | B2 | 7/2007 | Edwards et al. |
| 2002/0011694 | A1 | 1/2002 | Nichols et al. |
| 2002/0027314 | A1 | 3/2002 | Nichols et al. |
| 2002/0033560 | A1 | 3/2002 | Nichols et al. |
| 2004/0236066 | A1 | 11/2004 | Moore et al. |
| 2005/0085620 | A1 | 4/2005 | Bruckmann |
| 2005/0153086 | A1 | 7/2005 | Moore et al. |
| 2005/0170175 | A1 | 8/2005 | Nichols et al. |
| 2005/0171326 | A1 | 8/2005 | Edwards et al. |
| 2005/0261462 | A1 | 11/2005 | Nichols et al. |
| 2006/0106192 | A1 | 5/2006 | Xia |
| 2007/0059465 | A1 | 3/2007 | Thompson et al. |

(Continued)

FOREIGN PATENT DOCUMENTS

EP 1932867 A1 6/2008

(Continued)

OTHER PUBLICATIONS

International Preliminary Report on Patentability in commonly owned International Application No. PCT/US2007/73259, completed on Nov. 1, 2007.

(Continued)

Primary Examiner—Terressa M Boykin
(74) Attorney, Agent, or Firm—Summa, Additon & Ashe, P.A.

(57) ABSTRACT

The invention is a method for making condensation polymers, such as polyethylene terephthalate polyester. The method includes introducing a catalyst system, which includes a coordination catalyst component and an acid component, to a polycondensation reaction.

29 Claims, No Drawings

U.S. PATENT DOCUMENTS

2009/0082529 A1* 3/2009 Kageyama et al. ............ 526/66
2009/0187002 A1* 7/2009 Nichols et al. ........... 528/308.3
2009/0198022 A1 8/2009 Nichols et al.
2009/0306313 A1* 12/2009 Nichols ....................... 526/75

FOREIGN PATENT DOCUMENTS

| | | |
|---|---|---|
| JP | 62-197417 A | 9/1987 |
| WO | 03/082953 A1 | 10/2003 |
| WO | 2004/104080 A1 | 12/2004 |
| WO | 2005/073272 A1 | 8/2005 |
| WO | 2005/103110 A2 | 11/2005 |
| WO | 2006/079044 A3 | 7/2006 |
| WO | 2007/032325 A1 | 3/2007 |
| WO | 2007/059128 A1 | 5/2007 |
| WO | 2007/062384 A2 | 5/2007 |
| WO | 2007/127786 A2 | 11/2007 |
| WO | WO 2007127786 * | 11/2007 |
| WO | 2008/008813 A2 | 1/2008 |
| WO | 2008/008836 A1 | 1/2008 |

OTHER PUBLICATIONS

U.S. Appl. No. 60/739,498, filed Nov. 23, 2005 [cited in specification].

U.S. Appl. No. 60/807,038, filed Jul. 11, 2006 (priority provisional application) [cited in specification].

International Search Report and Written Opinion in counterpart International Application No. PCT/US2007/73224 dated Feb. 21, 2008.

International Search Report and Written Opinion in commonly owned International Application No. PCT/US2007/73259, dated Dec. 6, 2007.

English translation of Japanese Patent Application No. 62-197417.

International Preliminary Report on Patentability in counterpart International Application No. PCT/US2007/73224, completed on Nov. 27, 2007.

* cited by examiner

SOLID PHASE POLYMERIZATION CATALYST SYSTEM

CROSS-REFERENCE TO PRIORITY APPLICATIONS

This application is a continuation of commonly assigned International Patent Application No. PCT/US2007/73224 for a Solid Phase Polymerization Catalyst System, filed Jul. 11, 2007, (and published Jan. 17, 2008, as Publication No. WO2008/008813 A2), which itself claims the benefit of commonly assigned U.S. Provisional Patent Application No. 60/807,038, for a Solid Phase Polymerization Catalyst System, filed Jul. 11, 2006. This nonprovisional application claims the benefit of and incorporates entirely by reference both this international application and this U.S. provisional patent application.

CROSS-REFERENCE TO COMMONLY ASSIGNED APPLICATIONS

This application incorporates entirely by reference the following commonly assigned patent and patent applications, which disclose polymer resins and polymer processes: U.S. patent application Ser. No. 09/456,253, for a Method of Preparing Modified Polyester Bottle Resins, filed Dec. 7, 1999, now U.S. Pat. No. 6,284,866; U.S. patent application Ser. No. 09/851,240, for a Method of Preparing Modified Polyester Bottle Resins, filed May 8, 2001, now U.S. Pat. No. 6,335,422; U.S. patent application Ser. No. 10/850,269, for Methods of Making Titanium-Catalyzed Polyester Resins, filed May 20, 2004, (and published Nov. 24, 2005, as Publication No. 2005/0261462 A1), now abandoned; U.S. patent application Ser. No. 10/850,918, for Slow-Crystallizing Polyester Resins, filed May 21, 2004, now U.S. Pat. No. 7,129,317; U.S. patent application Ser. No. 10/996,789, for Polyester Preforms Useful for Enhanced Heat-Set Bottles, filed Nov. 24, 2004, now U.S. Pat. No. 7,094,863; U.S. patent application Ser. No. 11/466,066, filed Aug. 21, 2006, for Polyester Resins for High-Strength Articles, (and published Mar. 15, 2007, as Publication No. 2007/0059465 A1), now abandoned; U.S. patent application Ser. No. 11/046,481, for Methods of Making Imide-Modified Polyester Resins, filed Jan. 28, 2005, now U.S. Pat. No. 7,238,770; U.S. Provisional Patent Application Ser. No. 60/739,498, for Polyester Resins for High-Efficiency Injection Molding, filed Nov. 23, 2005; International Patent Application No. PCT/US06/61187 for Polyester Resins for High-Efficiency Injection Molding, filed Nov. 22, 2006 (and published May 31, 2007, as Publication No. WO 2007/062384); International Patent Application No. PCT/US04/16375 for Slow-Crystallizing Polyester Resins, filed May 21, 2004, (and published Dec. 2, 2004, as Publication No. WO 2004/104080); International Patent Application No. PCT/US04/39726 for Methods of Making Titanium-Catalyzed Polyethylene Terephthalate Resins, filed Nov. 24, 2004, (and published Nov. 3, 2005, as Publication No. WO 2005/103110); International Patent Application No. PCT/US05/03149 for Imide-Modified Polyester Resins and Methods of Making the Same, filed Jan. 28, 2005, (and published Aug. 11, 2005, as Publication No. WO 2005/073272); International Patent Application No. PCT/US06/02385 for Improved Polyamide-Polyester Polymer Blends and Methods of Making the Same, filed Jan. 23, 2006, (and published Jul. 27, 2006, as Publication No. WO 2006/079044); and International Patent Application No. PCT/U.S.07/67392 for Methods for Making Polyester Resins in Falling Film Melt Polycondensation Reactors, filed Apr. 25, 2007, (and published Nov. 8, 2007, as publication No. WO 2007/127786).

This application further incorporates entirely by reference the following commonly assigned patents and patent applications, which disclose methods for introducing additives to polymers: Ser. No. 08/650,291 for a Method of Post-Polymerization Stabilization of High Activity Catalysts in Continuous Polyethylene Terephthalate Production, filed May 20, 1996, now U.S. Pat. No. 5,898,058; Ser. No. 09/738,150, for Methods of Post-Polymerization Injection in Continuous Polyethylene Terephthalate Production, filed Dec. 15, 2000, now U.S. Pat. No. 6,599,596; Ser. No. 09/932,150, for Methods of Post-Polymerization Extruder Injection in Polyethylene Terephthalate Production, filed Aug. 17, 2001, now U.S. Pat. No. 6,569,991; Ser. No. 10/017,612, for Methods of Post-Polymerization Injection in Condensation Polymer Production, filed Dec. 14, 2001, now U.S. Pat. No. 6,573,359; Ser. No. 10/017,400, for Methods of Post-Polymerization Extruder Injection in Condensation Polymer Production, filed Dec. 14, 2001, now U.S. Pat. No. 6,590,069; Ser. No. 10/628,077, for Methods for the Late Introduction of Additives into Polyethylene Terephthalate, filed Jul. 25, 2003, now U.S. Pat. No. 6,803,082; and Ser. No. 10/962,167, for Methods for Introducing Additives into Polyethylene Terephthalate, filed Oct. 8, 2004, (and published Aug. 4, 2005, as Publication No. 2005/0170175 A1).

This application further incorporates entirely by reference the following commonly assigned patents and patent applications, which disclose polymer resins having reduced frictional properties and associated methods: Ser. No. 09/738,619, for Polyester Bottle Resins Having Reduced Frictional Properties and Methods for Making the Same, filed Dec. 15, 2000, now U.S. Pat. No. 6,500,890; Ser. No. 10/177,932 for Methods for Making Polyester Bottle Resins Having Reduced Frictional Properties, filed Jun. 21, 2002, now U.S. Pat. No. 6,710,158; Ser. No. 10/176,737 for Polymer Resins Having Reduced Frictional Properties, filed Jun. 21, 2002, now U.S. Pat. No. 6,727,306; and International Patent Application No. PCT/US06/044185, for Alumina-Enhanced Polyester Resins and Methods for Making the Same, filed Nov. 14, 2006 (and published May 24, 2007, as Publication No. WO 2007/059128).

BACKGROUND OF THE INVENTION

Because of their strength, heat resistance, and chemical resistance, polyester containers, films, sheets, and fibers are used worldwide in numerous consumer products. In this regard, most commercial polyester used for polyester containers, films, sheets, and fibers is polyethylene terephthalate polyester.

Polyester resins, especially polyethylene terephthalate and its copolyesters, are also widely used to produce rigid packaging, such as two-liter soft drink containers. Two-liter bottles and other polyester packaging produced by stretch-blow molding possess outstanding strength and shatter resistance, and have excellent gas barrier and organoleptic properties as well. Consequently, polyethylene terephthalate and other lightweight plastics have virtually replaced glass in packaging numerous consumer products (e.g., carbonated soft drinks, fruit juices, and peanut butter).

In a conventional process for making polyester resins, modified polyethylene terephthalate is polymerized in the melt phase to an intrinsic viscosity of about 0.6 dL/g, whereupon it is further polymerized in the solid phase to achieve an intrinsic viscosity that better promotes article formation. Thereafter, the polyethylene terephthalate may be formed into articles, such as by injection molding preforms, which in turn may be stretch-blow molded into bottles.

Conventional polycondensation processes that include solid state polymerization (SSP) can suffer from poor performance, in part because of poor reaction rates during solid state polymerization. Traditional metal catalysts may not satisfactorily increase the SSP reaction rates. Slower SSP rates require longer reaction times to achieve the desired polymer molecular weight, which in turn increases production costs.

It would therefore be desirable to develop a catalyst system and associated methods for improving the reaction rates during solid state polymerization of polycondensation polymers, particularly polyethylene terephthalate.

SUMMARY OF THE INVENTION

In one aspect, the invention is a method for efficiently making polyethylene terephthalate resins and other condensation polymers via solid state polymerization.

In another aspect, the invention is a catalyst system for improving the solid state polymerization rate for polyethylene terephthalate and other condensation polymers.

In yet another aspect, the invention is a method for improving the solid state polymerization rate for polyethylene terephthalate and other condensation polymers.

In yet another aspect, the invention is a method for making condensation polymers, such as polyethylene terephthalate, by introducing to the polycondensation reaction a catalyst system that includes a coordination catalyst component and an acid component.

In yet another aspect, the invention is a method for improving the solid state polymerization rates during the production of polyethylene terephthalate polymers. The method includes solid state polymerizing polyethylene terephthalate polymers in the presence of a catalyst system that includes a coordination catalyst component and an acid component.

In yet another aspect, the invention is a method of employing post polymerization introduction of an acid component to condensation polymers, such as polyethylene terephthalate, to increase the solid state polymerization rates of polycondensation reactions.

The foregoing, as well as other objectives and advantages of the invention and the manner in which the same are accomplished, is further specified within the following detailed description.

DETAILED DESCRIPTION

The invention embraces methods for making condensation polymers via solid state polymerization. To promote polymerization of the condensation polymers, the invention employs a coordination catalyst component and an acid component (i.e., the catalyst system). Without being bound to any theory, it appears that the coordination catalyst component tends to promote melt phase polymerization and the acid component tends to promote solid state polymerization.

As herein discussed, with respect to the present catalyst system, the coordination catalyst component embraces one or more coordination catalysts such as titanium catalysts, antimony catalysts, germanium catalysts, and aluminum catalysts, and the acid component embraces relatively strong acids (e.g. those having a pKa less than about 0 and/or a Hammett acidity ($H_o$) less than about −5). The present catalyst system may further include one or more supplemental catalysts, such as cobalt catalysts, manganese catalysts, and zinc catalysts.

Polyesters are exemplary polycondensation polymers, and so the present invention is herein described with particular reference to processes for making polyethylene terephthalate resins.

Those having ordinary skill in the art will know that there are two primary methods for making polyethylene terephthalate. Each of these methods reacts a terephthalate component and a diol component (i.e., a terephthalate moiety and a diol moiety) to form polyethylene terephthalate prepolymers, and then polymerizes the prepolymers via melt phase polycondensation to form polyethylene terephthalate polymers.

The first method involves a two-step ester exchange reaction and polymerization using dimethyl terephthalate and excess ethylene glycol. In this method, the aforementioned step of reacting a terephthalate component and a diol component includes reacting dimethyl terephthalate and ethylene glycol in a heated, catalyzed ester exchange reaction (i.e., transesterification) to form bis(2-hydroxyethyl)terephthalate monomers, as well as methanol as a byproduct. To enable the ester exchange reaction to go essentially to completion, methanol is continuously removed as it is formed. The bis(2-hydroxyethyl)terephthalate monomer product is then catalytically polymerized via polycondensation (i.e., melt phase and/or solid state polymerization) to produce polyethylene terephthalate polymers.

The second method employs a direct esterification reaction using terephthalic acid and excess ethylene glycol. In this method, the aforementioned step of reacting a terephthalate component and a diol component includes reacting terephthalic acid and ethylene glycol in a heated esterification reaction to form monomers and oligomers of terephthalic acid and ethylene glycol, as well as water as a byproduct. To enable the esterification reaction to go essentially to completion, water is continuously removed as it is formed. The monomers and oligomers are subsequently catalytically polymerized via polycondensation (i.e., melt phase and/or solid state polymerization) to form polyethylene terephthalate polyester. Ethylene glycol is continuously removed during polycondensation to create favorable reaction kinetics.

The polyethylene terephthalate polymers achieved via direct esterification of terephthalic acid are substantially identical to the polyethylene terephthalate polymers achieved via ester interchange of dimethyl terephthalate, albeit with some minor chemical differences (e.g., end group differences). As compared with the transesterification of dimethyl terephthalate, the direct esterification of terephthalic acid is not only more economical but often yields polyethylene terephthalate resins having better color.

Accordingly, in one aspect the invention includes polymerizing polyethylene terephthalate prepolymers via melt phase polycondensation in the presence of the catalyst system (i.e., the coordination catalyst component and the acid component) to achieve a polycondensation intermediate having an intrinsic viscosity of at least about 0.40 dL/g. The polycondensation intermediate, which, depending on the extent of melt phase polycondensation, includes polyethylene terephthalate prepolymers and/or polyethylene terephthalate polymers, is thereupon further polymerized in the solid state.

In another aspect the invention includes polymerizing, via melt phase polycondensation and in the presence of a coordination catalyst, polyethylene terephthalate prepolymers to yield polyethylene terephthalate polymers (e.g., having an intrinsic viscosity of 0.45 dL/g or so). Thereafter, the acid component of the catalyst system is introduced to the polyethylene terephthalate polymers (i.e., late acid introduction), and the polyethylene terephthalate polymers are further polymerized in the solid state.

In an exemplary embodiment according to this aspect of the invention (i.e., late acid introduction), the acid component of the catalyst system may be added to the melt phase polymerization after the intrinsic viscosity of the polymer melt is between about 0.45 dL/g and 0.6 dL/g. Alternatively, the acid component may be introduced to the polymer melt after the polyethylene terephthalate polymers achieve an intrinsic viscosity of about 0.50 dL/g. In yet another exemplary embodiment, the melt phase polymerization step may achieve an intrinsic viscosity of about 0.55 dL/g before the acid component is introduced. In some embodiments, the acid component is introduced to the polymer melt only after the polyethylene terephthalate polymers achieve an intrinsic viscosity of about 0.60 dL/g.

Late acid addition notwithstanding, it is also within the scope of the invention to introduce the acid component prior to melt-phase polycondensation (e.g., during or immediately after esterification). Earlier acid addition (e.g., prior to or during esterification), however, can promote the formation of excessively high fractions of diethylene glycol (e.g., greater than about 4 mole percent diethylene glycol).

It is further within the scope of the invention to introduce the acid component to the polyethylene terephthalate prepolymers during melt phase polycondensation. In such embodiments, the polyethylene terephthalate prepolymers will typically possess a carboxyl end group concentration of more than about 50 microequivalents per gram at the time of acid introduction (e.g., 60 microequivalents per gram or more). More typically, the polyethylene terephthalate prepolymers will possess a carboxyl end group concentration of more than about 75 microequivalents per gram at the time of acid introduction (e.g. 100 microequivalents per gram or more). To the extent that the acid is introduced earlier during melt phase polycondensation, the end group concentration of the polyethylene terephthalate prepolymers will be higher. In this regard, it is not unusual for the carboxyl end group concentration to exceed 150 microequivalents per gram (e.g., 200 microequivalents per gram or more) and even 300 microequivalents per gram when the acid is introduced into the initial polycondensation vessel (i.e., the low polymerizer).

By way of contrast, polyethylene terephthalate polymers (e.g., having an intrinsic viscosity of 0.45 dL/g or so) typically have a carboxyl end group concentration of less than about 75 microequivalents per gram. Accordingly, in process embodiments in which the acid component is introduced to the polyethylene terephthalate polymers (i.e., late acid introduction), the polyethylene terephthalate polymers typically have a carboxyl end group concentration of less than about 75 microequivalents per gram, more typically less than 50 microequivalents per gram. It is possible, however, to introduce the acid component to polyethylene terephthalate polymers possessing a carboxyl end group concentration of more than about 50 microequivalents per gram.

In yet another aspect, the invention includes polymerizing polyethylene terephthalate prepolymers in the melt phase to form a polyethylene terephthalate intermediate possessing an intrinsic viscosity of between about 0.25 dL/g and 0.40 dL/g, and an average apparent crystallite size of less than 9 nm. The melt phase polycondensation proceeds in the presence of the coordination catalyst component and, optionally, the acid component. Those having ordinary skill in the art will appreciate, however, that the acid component can be introduced any time prior to solid state polymerization. The polyethylene terephthalate intermediate is polymerized in the solid phase to form a high molecular weight polyester resin having an intrinsic viscosity of at least about 0.70 dL/g and a solid phase density of less than 1.413 g/cc. This aspect of the invention, which may be practiced in accordance with commonly owned U.S. Pat. Nos. 6,284,866 and 6,335,422, typically embraces polyester resins that include at least about 4 mole percent diacid or diester substitution and at least about 2 mole percent diol substitution.

In most embodiments of the present invention, melt phase polycondensation continues until polyethylene terephthalate polymers having a target intrinsic viscosity of at least about 0.45 dL/g are achieved. In other words, solid state polymerization is typically delayed until "high polymers" are attained. Indeed, the polyethylene terephthalate prepolymers are typically polymerized via melt phase polycondensation to achieve polyethylene terephthalate polymers having an intrinsic viscosity of at least about 0.50 dL/g (e.g., about 0.55 dL/g), more typically at least about 0.60 dL/g (e.g., 0.65-0.75 dL/g).

To the extent the catalyst system of the present invention promotes solid state polymerization, however, it may be desirable to initiate solid state polymerization somewhat earlier. Accordingly, in many embodiments the polyethylene terephthalate prepolymers are polymerized via melt phase polycondensation to achieve polyethylene terephthalate polymers having an intrinsic viscosity of only about 0.75 dL/g or less (e.g., about 0.70 dL/g), followed by solid state polymerization. In other embodiments the polyethylene terephthalate prepolymers are polymerized via melt phase polycondensation to achieve polyethylene terephthalate polymers having an intrinsic viscosity of only about 0.60 dL/g or less before solid state polymerization is initiated.

After melt phase polymerization is complete, the polyethylene terephthalate polymers are further polymerized in the solid phase to yield polyethylene terephthalate resin having an intrinsic viscosity between about 0.65 dL/g and 1.1 dL/g (e.g., more than about 0.8 dL/g). For example, for polyethylene terephthalate bottle resins, the solid state polymerization continues to achieve an intrinsic viscosity between about 0.7 dL/g and 0.9 dL/g.

As will be understood by those of ordinary skill in the art, macromolecules having a degree of polymerization of about 70 are considered high polymers. For polyethylene terephthalate polymers, this roughly translates to a molecular weight of at least about 13,000 g/mol. At this molecular weight, polyethylene terephthalate polymers possess sufficient molecular weight, mechanical properties, melt strength, and crystallinity to facilitate polymer processing. Moreover, for polyethylene terephthalate polymers, a degree of polymerization of about 70 corresponds to an intrinsic viscosity of about 0.45 dL/g and a degree of polymerization of about 100 corresponds to an intrinsic viscosity of about 0.61 dL/g.

As used herein, the term "intrinsic viscosity" is the ratio of the specific viscosity of a polymer solution of known concentration to the concentration of solute, extrapolated to zero concentration. Intrinsic viscosity, which is widely recognized as standard measurements of polymer characteristics, is directly proportional to average polymer molecular weight. See, e.g., *Dictionary of Fiber and Textile Technology*, Hoechst Celanese Corporation (1990); Tortora & Merkel, *Fairchild's Dictionary of Textiles* (7$^{th}$ Edition 1996).

Intrinsic viscosity can be measured and determined without undue experimentation by those of ordinary skill in this art. For the intrinsic viscosity values described herein, the intrinsic viscosity is determined by dissolving the polyester in orthochlorophenol (OCP), measuring the relative viscosity of the solution using a Schott Autoviscometer (AVS Schott and AVS 500 Viscosystem), and then calculating the intrinsic viscosity based on the relative viscosity. See, e.g. *Dictionary of Fiber and Textile Technology* ("intrinsic viscosity").

In particular, a 0.6-gram sample (+/−0.005 g) of dried polymer sample is dissolved in about 50 ml (61.0-63.5 grams) of orthochlorophenol at a temperature of about 105° C. Fibrous samples are typically cut into small pieces, whereas chip samples are ground. After cooling to room temperature, the solution is placed in the viscometer at a controlled, constant temperature (e.g., between about 20° C. and 25° C.), and the relative viscosity is measured. As noted, intrinsic viscosity is calculated from relative viscosity.

As noted, the present catalyst system includes one or more coordination catalysts (e.g., titanium, antimony, germanium, and/or aluminum) and, optionally, one or more supplemental catalysts (e.g., cobalt, manganese, and zinc). The coordination catalysts and the optional supplemental catalysts are introduced in amounts sufficient to promote melt polymerization. The catalyst system further includes as the acid component, which is typically an acid having a pKa of less than about 0, more typically less than about −2 (e.g., −3 or less). (Typically, pKa values are referenced to 25° C.) By way of example, the molar ratio of the coordination catalyst component to the acid component is between about 4:1 and 1:10, depending upon the catalytic efficacy of the respective components.

The coordination catalysts and the supplemental catalysts, if any, are usually introduced before melt phase polycondensation (i.e., during or immediately after esterification or transesterification) or shortly after the onset of melt phase polycondensation. Those having ordinary skill in the art will appreciate that the start of melt polycondensation is characterized by reduced pressure conditions (i.e., reaction at less than atmospheric pressure). The acid component is usually introduced during melt phase polycondensation (i.e., added to either prepolymers or polymers) or after melt phase polycondensation (i.e., added to polymers). The acid component is best introduced to the polyethylene terephthalate polymers before initiating solid state polymerization.

The coordination catalyst is typically introduced before or concurrently with the acid component, though it is within the scope of the invention to introduce the acid component before the coordination catalyst. For example, the acid component might be introduced at the end of esterification (i.e., prior to melt phase polycondensation) and the coordination catalyst might be introduced after the initiation of melt phase polycondensation (i.e., during melt phase polycondensation). It is further within the scope of the invention to introduce the coordination catalysts and the supplemental catalysts together.

Without being bound by theory, it is believed that coordination catalysts, such as titanium, antimony, germanium, and aluminum, function by coordinating to the reactants, thereby bringing the reactive groups into close proximity and catalyzing reactions. Supplemental catalysts, such as cobalt, manganese, and zinc, are typically Lewis acid catalysts that function as co-catalysts with the coordination catalysts. As a general rule, catalysis rates of coordination catalysts that are used with supplemental catalysts are better than the catalysis rates of supplemental catalysts that are used without coordination catalysts.

Those having ordinary skill in the art recognize that, on a molar basis, coordination catalysts (e.g., aluminum, antimony, germanium, and titanium) will possess varying catalytic efficacy. For example, it is well known that, on a molar basis, germanium is a much more effective catalyst than is antimony. Likewise, on a molar basis, titanium is a much more effective catalyst than is germanium.

The total concentration of elemental metals present in the coordination catalysts and supplemental catalysts, if any, is typically greater than about $10^{-4}$ mole per mole of polymer repeat units (e.g., between about $1-3\times10^{-4}$ mole per mole of polymer repeat units). In other words, in the resulting polyethylene terephthalate resin, the elemental metals concentration attributable to coordination catalysts and supplemental catalysts is greater than about $10^{-4}$ mole per mole of polymer repeat units, such as between about $2.5-7.5\times10^{-4}$ mole per mole of polymer repeat units (e.g. about $5\times10^{-4}$ mole per mole of polymer repeat units). For some catalyst systems, the total concentration of elemental metals attributable to the coordination catalysts and supplemental catalysts, if any, may be greater than about $10^{-3}$ mole per mole of polymer repeat units.

Accordingly, in one embodiment, the coordination catalyst component includes titanium. Exemplary titanium catalysts include, without limitation, titanates, such as titanium diisopropoxide bis(acetyl-acetonate) or tetrabutyl titanate. In an exemplary titanium embodiment, the coordination catalyst component is introduced in amounts sufficient for the resulting polyethylene terephthalate resin to include between about 2 and 50 ppm of elemental titanium (e.g., greater than about 25 ppm of elemental titanium). In another exemplary titanium embodiment, the coordination catalyst component is introduced in amounts such that the resulting polyethylene terephthalate resin includes less than about 25 ppm of elemental titanium, typically between about 2 and 20 ppm of elemental titanium (e.g., between about 5 and 15 ppm elemental titanium, such as about 10 ppm of elemental titanium).

In another embodiment, the coordination catalyst component includes germanium. In an exemplary germanium embodiment, the coordination catalyst component is introduced in amounts sufficient for the resulting polyethylene terephthalate resin to include at least about 2 ppm of elemental germanium (e.g., between about 2 and 50 ppm of elemental germanium). In another exemplary germanium embodiment, the coordination catalyst component is introduced in amounts sufficient for the resulting polyethylene terephthalate resin to include more than about 40 ppm of elemental germanium (e.g., more than about 50 ppm of elemental germanium), typically more than about 70 ppm of elemental germanium (e.g., more than about 100 ppm of elemental germanium). In some instances, however, the present polyethylene terephthalate resins employ one or more other coordination catalysts and are essentially free of elemental germanium.

In another embodiment, the coordination catalyst component includes antimony. In an exemplary antimony embodiment, the coordination catalyst component is introduced in amounts sufficient for the resulting polyethylene terephthalate resin to include between about 25 and 300 ppm of elemental antimony. In another exemplary antimony embodiment, the coordination catalyst component is introduced in amounts sufficient for the resulting polyethylene terephthalate resin to include more than about 40 ppm of elemental antimony (e.g., more than about 65 ppm of elemental antimony), typically more than about 75 ppm of elemental antimony (e.g., more than about 125 ppm of elemental antimony). In other embodiments employing higher concentrations of antimony, the coordination catalyst component is introduced in amounts sufficient for the resulting polyethylene terephthalate resin to include more than about 150 ppm of elemental antimony (e.g., between about 175 and 325 ppm of elemental antimony), and perhaps more than about 200 ppm of elemental antimony. In other instances, however, the present polyethylene terephthalate resins employ one or more other coordination catalysts and are essentially free of elemental antimony.

In another embodiment, the coordination catalyst component includes aluminum. In an exemplary aluminum embodiment, the coordination catalyst component is introduced in amounts sufficient for the resulting polyethylene terephthalate resin to include between about 10 and 100 ppm of elemental aluminum. In another exemplary aluminum embodiment, the coordination catalyst component is introduced in amounts sufficient for the resulting polyethylene terephthalate resin to include between about 5 and 50 ppm of elemental aluminum.

As noted, the acid component of the catalyst system includes an acid having a pKa of less than about 0 (e.g. −2 or less). Strong acids, in particular, may be characterized according to Hammett acidity ($H_o$). In this regard, and the acid component of the catalyst system may have a Hammett acidity ($H_o$) of less than about −5 (e.g. less than −8 or so).

Those having ordinary skill in the art will appreciate that protonic acids stronger than 100 percent protonic sulfuric acid can be considered super acids. A number of methods are available for estimating acidity in solution. The best known method is the direct measurement of hydrogen ion activity used in defining the pH.

$$pH = -\log a_{H+} \qquad \text{Eq. 1}$$

This can be achieved by measuring the potential of a hydrogen electrode in equilibrium with a dilute acid solution. In highly concentrated acid solutions, the pH concept is no longer applicable and the acidity must be closely related to the degree of transformation of a base with its conjugate acid. This is measured by the Hammett acidity function:

$$H_o = pK_{BH+} - \log (BH+/B) \qquad \text{Eq. 2}$$

Here the pKBH+ is the dissociation constant of the conjugate acid (BN+), and BH=/B is the ionization ratio, which is generally measured by spectroscopic means (e.g., ultraviolet, nuclear magnetic resonance, and dynamic NMR). The Hammett acidity function is described on a logarithmic scale upon which 100 percent sulfuric acid has a Hammett acidity ($H_o$) of −11.9 and anhydrous HF has a Hammett acidity ($H_o$) of −11.0. By way of comparison, phosphoric acid has Hammett acidity ($H_o$) of about −5.

Table 1 (below) provides Hammett acidity ($H_o$) values for various acids:

TABLE 1

| Acid | Hammett Acidity ($H_o$) |
| --- | --- |
| $HSO_3F/SbF_5/SO_3$ | <−16 |
| $HF/SbF_5$ | −15.2 |
| $HSO_3F$ | −12.6 |
| $H_2SO_4$ | −11.0 |
| HF | −10.2 (3.2 @ 0.1M) |
| $H_3PO_4$ | −5.0 |
| $H_2SO_4$ (63% aq.) | −4.9 |
| $HCO_2H$ | −2.2 (3.7 @ 0.1M) |

See Greenwood & Earnshaw, Chapter 3 Hydrogen (Second Ed. 1997) (http://web.utk.edu/~adcock00/g531fs03.pdf)

Acids contemplated as being especially useful in one particular embodiment of the present invention include acids that are at least about as strong as sulfuric acid (i.e., "super acids"). Other exemplary acids in another particular embodiment of the present invention include those that are substantially free of a salt form.

The water content of the acid or acids is controlled at low levels not only to reduce corrosion of polymer processing equipment but also to reduce hydrolysis of the polyethylene terephthalate prepolymers and/or polymers. In this regard, the acid should possess less than about five weight percent water, typically less than about two weight percent water (e.g. less than about one weight percent water).

Exemplary acids contemplated as useful in the present invention include one or more of trifluoromethanesulfonic acid, magic acid, aromatic sulfonic acids, perchloric acid, fluorosulfuric acid, benzene sulfonic acid, p-toluene sulfonic acid, naphthalene sulfonic acid, ethane sulfonic acid, cyclohexane sulfonic acid, and propane sulfonic acid. In some embodiments, preferred acids include aromatic sulfonic acids.

Particular acid formulations useful in practicing the present invention include, for example; 2-hydroxy-4-methoxy benzophenone-5-sulfonic acid, a UV absorber available from Chitec Technology Company; 10-camphor sulfonic acid, available from Aldrich Chemical; dodecyl benzenesulfonic acid, available as BIOSOFT S-101 from Stepan Chemical; dodecyl diphenylether disulfonic acid, available in a 50 percent aqueous solution from Pilot Chemical; 1-propane sulfonic acid, available from Aldrich Chemical; xylene sulfonic acid, available from Aldrich Chemical; and zinc para-toluenesulfonate, available from Aldrich Chemical.

WORKING EXAMPLES

Without being bound by any theory, the present invention employs a catalyst system that includes a coordination catalyst component, which promotes melt phase polymerization, and an acid component, which promotes solid state polymerization.

The following 35 laboratory examples provide the 10-hour solid state polymerization, intrinsic viscosity increase (i.e., SSP IV lift), if any, for polyethylene terephthalate polymers catalyzed by various catalyst systems. (The comparative examples are shaded.) As shown (below), these laboratory examples employed (i) a coordination catalyst (e.g., titanium, antimony, and/or germanium) and, optionally, a supplemental catalyst (e.g., cobalt), and/or (ii) a strong acid, which is introduced at various stages of esterification and polycondensation. Before initiating solid state polymerization, the polyethylene terephthalate polymers of Examples 1-35 were processed under reduced pressure through a four-hour drying cycle at 175° C. Solid state polymerization was performed under vacuum (e.g., less than 0.25 torr at 200-210° C.).

Table 2 (below) lists the SSP catalysts (i.e., acid components) tested:

TABLE 2

| | Experimental SSP Catalysts |
| --- | --- |
| ATSA | 2-aminotoluene sulfonic acid (Aldrich Chemical) |
| BP-4 | 2-hydroxy-4-methoxy benzophenone-5-sulfonic acid (UV absorber) (Chitec Technology Company) |
| 2-CPA | 2-carboxyethyl phosphonic acid (Aldrich Chemical) |
| CSA | 10-camphor sulfonic acid (Aldrich Chemical) |
| DBSA | dodecyl benzenesulfonic acid (BIOSOFT S-101) (Stepan Chemical) |
| DBA-70 | dodecyl diphenylether disulfonic acid (50% aqueous solution) (Pilot Chemical) |
| K-DBSA | dodecyl benzenesulfonic acid (BIOSOFT S-101 neutralized with 1 eq. potassium hydroxide) (Stepan Chemical) |
| n-DBSA | dodecyl benzenesulfonic acid (BIOSOFT S-101 neutralized with 1 eq. tetramethyl ammonium hydroxide) (Stepan Chemical) |
| PDFA | pentadecafluoro octanoic acid (Aldrich Chemical) |
| PhPA | phenyl phosphonic acid (Aldrich Chemical) |
| PSA | 1-propane sulfonic acid (Aldrich Chemical) |
| XSA | xylene sulfonic acid (Aldrich Chemical) |
| ZPTSA | zinc para-toluenesulfonate (Aldrich Chemical) |

These acids were introduced to the reactants (i.e., the diacid moiety and the diol moiety) to (i) polyethylene terephthalate prepolymers at the start of melt polycondensation (i.e., immediately prior to the first vacuum stage of melt polycondensation—PC) or (ii) polyethylene terephthalate polymer melt after the completion of melt polycondensation (i.e., immediately after the final stage of melt polycondensation—PPI). Zinc para-toluenesulfonate was also introduced at the initiation of esterification (ES).

Table 3 (below) provides experimental results for polyethylene terephthalate polymers that were melt polymerized in the presence of a titanium coordination catalyst and a cobalt supplemental catalyst in amounts sufficient for the resulting polyethylene terephthalate resin to include about 7 ppm elemental titanium and 30 ppm elemental cobalt:

oxy benzophenone-5-sulfonic acid; 10-camphor sulfonic acid; dodecyl benzenesulfonic acid; dodecyl diphenylether disulfonic acid; 1-propane sulfonic acid; and xylene sulfonic acid) enhanced solid state polymerization as measured by intrinsic viscosity lift after ten hours at 210° C. (i.e., 10-hour SSP IV lift). Example 1, for instance, shows that the inclusion of xylene sulfonic acid, a strong acid, in a titanium-based catalyst system provides a 10-hour SSP IV lift of 0.345 dL/g, over twice the 10-hour SSP IV lift of Comparative Examples 11-12.

Table 3 underscores that to achieve superior solid state polymerization efficacy the acid component should retain high acidity. For instance, comparing Examples 2, 7, and 8, which use dodecyl benzenesulfonic acid (BIOSOFT S-101), against Examples 14 and 17, which employ neutralized dode-

TABLE 3

| Ex. | IPA (mol %) | Coordination catalyst | ppm | Supplemental catalyst | ppm | SSP Catalyst acid | ppm | μmol/g | addition | SSP Properties start IV (dL/g) | end IV (dL/g) | (° C.) | 10-hr IV (dL/g) |
|---|---|---|---|---|---|---|---|---|---|---|---|---|---|
| 1 | 3 | Ti | 7 | Co | 30 | XSA | 570 | 3.14 | PC | 0.618 | 0.964 | 210 | 0.346 |
| 2 | 3 | Ti | 7 | Co | 30 | DBSA | 1000 | 3.14 | PPI | 0.613 | 0.953 | 210 | 0.340 |
| 3 | 3 | Ti | 7 | Co | 30 | CSA | 710 | 0.314 | PPI | 0.598 | 0.911 | 210 | 0.313 |
| 4 | 3 | Ti | 7 | Co | 30 | BP-4 | 480 | 1.57 | PPI | 0.618 | 0.889 | 210 | 0.271 |
| 5 | 3 | Ti | 7 | Co | 30 | DBA-70 | 780 | 1.57 | PC | 0.641 | 0.908 | 210 | 0.267 |
| 6 | 3 | Ti | 7 | Co | 30 | XSA | 570 | 3.14 | PPI | 0.567 | 0.814 | 210 | 0.247 |
| 7 | 3 | Ti | 7 | Co | 30 | DBSA | 500 | 1.57 | PC | 0.612 | 0.845 | 210 | 0.233 |
| 8 | 3 | Ti | 7 | Co | 30 | DBSA | 250 | 0.785 | PC | 0.600 | 0.802 | 210 | 0.202 |
| 9 | 3 | Ti | 7 | Co | 30 | PSA | 200 | 1.57 | PPI | 0.608 | 0.794 | 210 | 0.186 |
| 10 | 3 | Ti | 7 | Co | 30 | PSA | 200 | 1.57 | PC | 0.632 | 0.801 | 210 | 0.169 |
| 11 | 3 | Ti | 7 | Co | 30 | — | | | | 0.645 | 0.802 | 210 | 0.157 |
| 12 | 3 | Ti | 7 | Co | 30 | — | | | | 0.647 | 0.785 | 210 | 0.138 |
| 13 | 3 | Ti | 7 | Co | 30 | ATSA | 295 | 1.57 | PPI | 0.612 | 0.747 | 210 | 0.1356 |
| 14 | 3 | Ti | 7 | Co | 30 | K-DBSA | 500 | 1.57 | PC | 0.627 | 0.761 | 210 | 0.134 |
| 15 | 3 | Ti | 7 | Co | 30 | PDFA | 650 | 1.57 | PC | 0.637 | 0.763 | 210 | 0.126 |
| 16 | 3 | Ti | 7 | Co | 30 | 2-CPA | 242 | 1.57 | PC | 0.641 | 0.752 | 210 | 0.111 |
| 17 | 3 | Ti | 7 | Co | 30 | n-DBSA | 500 | 1.57 | PC | 0.608 | 0.717 | 210 | 0.109 |
| 18 | 3 | Ti | 7 | Co | 30 | PDFA | 650 | 1.57 | PPI | 0.613 | 0.721 | 210 | 0.108 |
| 19 | 3 | Ti | 7 | Co | 30 | PhPA | 248 | 1.57 | PC | 0.634 | 0.710 | 210 | 0.076 |
| 20 | 3 | Ti | 7 | Co | 30 | 2-PCA | 242 | 1.57 | PPI | 0.607 | 0.678 | 210 | 0.071 |
| 21 | 3 | Ti | 7 | Co | 30 | ATSA | 295 | 1.57 | PC | 0.623 | 0.689 | 210 | 0.066 |
| 22 | 3 | Ti | 7 | Co | 30 | PhPA | 248 | 1.57 | PPI | 0.604 | 0.652 | 210 | 0.048 |

As noted in Table 3, Examples 1-22 compare polyethylene terephthalate resins possessing relatively low comonomer substitution (e.g., less than 10 mole percent). In this regard, each polyethylene terephthalate resin was formed from a diacid moiety that included about 97 mole percent terephthalic acid and 3 mole percent isophthalic acid (i.e., the diacid comonomer) and a diol moiety that included about 100 mole percent ethylene glycol. Those having ordinary skill in the art will appreciate that the resulting polyethylene terephthalate resins included somewhat higher comonomer substitution because of the formation of comonomer byproducts (e.g., diethylene glycol) during esterification and the incorporation of such byproducts into the polymer chains during polycondensation.

As compared with catalyst systems devoid of a strong acid (e.g. Comparative Examples 11-12), catalyst systems that included certain acid formulations (i.e., 2-hydroxy-4-methcyl benzenesulfonic acid (BIOSOFT S-101), neutralized, respectively, with one equivalent of potassium hydroxide or with one equivalent of tetramethyl ammonium hydroxide. It appears that neutralized (i.e., weaker) acids deliver inferior solid state polymerization performance.

Some suitable SSP catalysts according to present invention are surfactants (e.g., dodecyl benzenesulfonic acid), which can cause foaming during polymerization. Consequently, including an anti-foam agent may be desirable. An acceptable anti-foaming agent is Dow Corning's Antifoam 1500.

Table 4 (below) provides experimental results for polyethylene terephthalate polymers that are melt polymerized in the presence of single and mixed coordination catalysts (i.e., germanium and antimony) and with and without a supplemental catalyst (i.e., cobalt):

TABLE 4

| | IPA | Coordination | | Supplemental | | SSP Catalyst | | | | SSP Properties | | | 10-hr IV |
| | | | | | | | | | | start IV | end IV | | |
| Ex. | (mol %) | catalyst | ppm | catalyst | ppm | acid | ppm | μmol/g | addition | (dL/g) | (dL/g) | (° C.) | (dL/g) |
|---|---|---|---|---|---|---|---|---|---|---|---|---|---|
| 23 | 10 | Ge | 150 | — | | DBSA | 500 | 1.57 | PC | 0.596 | 0.884 | 200 | 0.288 |
| 24 | 10 | Ge | 150 | — | | | | — | | 0.595 | 0.780 | 200 | 0.185 |
| 25 | 10 | Sb | 240 | — | | DBSA | 500 | 1.57 | PC | 0.589 | 0.885 | 200 | 0.296 |
| 26 | 10 | Sb | 240 | — | | | | — | | 0.592 | 0.772 | 200 | 0.180 |
| 27 | 10 | Sb | 240 | Co | 10 | DBSA | 500 | 1.57 | PC | 0.596 | 0.843 | 200 | 0.247 |
| 28 | 10 | Sb | 240 | Co | 10 | | | — | | 0.612 | 0.822 | 200 | 0.210 |
| 29 | 10 | Sb | 30 | Co | 10 | DBSA | 500 | 1.57 | PC | 0.619 | 0.825 | 200 | 0.206 |
| | | Ge | 150 | | | | | | | | | | |
| 30 | 10 | Sb | 30 | Co | 10 | | | — | | 0.593 | 0.765 | 200 | 0.172 |
| | | Ge | 150 | | | | | | | | | | |

In comparison to the polyethylene terephthalate resins listed in Table 3, Examples 23-30 compare polyethylene terephthalate resins possessing somewhat more comonomer substitution (i.e., more than about 10 mole percent). In this regard, each polyethylene terephthalate resin was formed from a diacid moiety that included about 90 mole percent terephthalic acid and 10 mole percent isophthalic acid (i.e., the diacid comonomer) and a diol moiety that included about 100 mole percent ethylene glycol. As noted, the resulting polyethylene terephthalate resins included somewhat higher comonomer substitution because of the presence of comonomer byproducts (e.g., diethylene glycol).

The polyethylene terephthalate resins disclosed in Table 4 were solid state polymerized at a slightly lower temperature (i.e., 200° C.) than those disclosed in Table 3. In this regard, a lower SSP temperature was employed because polyesters having high comonomer substitution (e.g., more than about 8 mole percent) tend to possess depressed melting points. Indeed, such polyesters have been difficult, if not impossible, to polymerize economically in the solid phase. The present invention facilitates the solid state polymerization of these kinds of highly substituted polyesters, a practical commercial advantage.

In particular, Table 4 compares the effect upon solid state polymerization efficiency by including dodecyl benzenesulfonic acid (BIOSOFT S-101) for four combinations of coordination and supplemental catalysts. (As with Table 3, the catalyst concentrations refer to the amounts of elemental germanium, antimony, and or cobalt in the resulting polyethylene terephthalate resin.) In each instance, introducing dodecyl benzenesulfonic acid (BIOSOFT S-101) substantially improved solid state polymerization as measured by SSP IV lift after ten hours at 200° C. Table 4 shows that the inclusion of a strong acid makes for a more effective solid state polymerization catalyst system.

Table 5 (below) provides experimental results for polyethylene terephthalate polymers that are melt polymerized in the presence of an antimony coordination catalyst and a cobalt supplemental catalyst in amounts sufficient for the resulting polyethylene terephthalate resin to include about 250 ppm elemental antimony and about 25 ppm elemental cobalt:

TABLE 5

| | IPA | Coordination | | Supplemental | | SSP Catalyst | | | | SSP Properties | | | 10-hr IV |
| | | | | | | | | | | start IV | end IV | | |
| Ex. | (mol %) | catalyst | ppm | catalyst | ppm | acid | ppm | μmol/g | addition | (dL/g) | (dL/g) | (° C.) | (dL/g) |
|---|---|---|---|---|---|---|---|---|---|---|---|---|---|
| 31 | 3 | Sb | 250 | Co | 25 | DBSA | 500 | 1.57 | PPI | 0.623 | 0.912 | 210 | 0.289 |
| 32 | 3 | Sb | 250 | Co | 25 | | | — | | 0.643 | 0.877 | 210 | 0.234 |

Table 5 affirms the findings presented in Table 4—the inclusion of a strong acid makes for a more effective solid phase catalyst system—for polyethylene terephthalate polymers having somewhat lower comonomer substitution. As with Table 3, Examples 31-32 include relatively lower comonomer substitution—3 mole percent isophthalic acid. As compared with Example 32, Example 31 shows that introducing dodecyl benzenesulfonic acid (BIOSOFT S-101) improved solid state polymerization as measured by SSP IV lift after ten hours at 210° C.

Table 6 (below) provides experimental results for polyethylene terephthalate polymers that are melt polymerized in the presence of zinc para-toluenesulfonate, with and without a coordination catalyst (i.e., titanium or antimony) and a supplemental catalyst (i.e., cobalt):

TABLE 6

| | IPA | Coordination | | Supplemental | | SSP Catalyst | | | | SSP Properties | | | 10-hr IV |
|---|---|---|---|---|---|---|---|---|---|---|---|---|---|
| | | | | | | | | | | start IV | end IV | | |
| Ex. | (mol %) | catalyst | ppm | catalyst | ppm | acid | ppm | µmol/g | addition | (dL/g) | (dL/g) | (° C.) | (dL/g) |
| 33 | 3 | Ti | 7 | Co | 30 | ZPTSA | 630 | 1.5 | PC | 0.611 | 0.889 | 210 | 0.278 |
| 34 | 3 | Sb | 250 | Co | 25 | ZPTSA | 630 | 1.5 | PPI | 0.616 | 1.030 | 210 | 0.414 |
| 35 | 3 | — | | — | | ZPTSA | 630 | 1.5 | ES | insufficient melt polymerization | | | |

Table 6 shows that, when included as one component of a catalyst system that also includes at least a coordination catalyst, zinc para-toluenesulfonate boosts 10-hour SSP IV lift. For instance, as compared with Examples 11-12, which employ a titanium coordination catalyst and a cobalt supplemental catalyst, Example 33 shows that zinc para-toluenesulfonate substantially improves solid state polymerization efficiency. Likewise, as compared with Example 28, which employs a germanium coordination catalyst and a cobalt supplemental catalyst, Example 34 shows that zinc para-toluenesulfonate substantially improves solid state polymerization efficiency. Example 35, however, shows that without the presence of a coordination catalyst and a supplemental catalyst, melt polymerization fails, rendering intrinsic viscosity gain during solid state polymerization immaterial.

Examples 1-35 illustrate that, under otherwise comparable SSP conditions (i.e., time and temperature), certain catalyst systems that include both a coordination catalyst component and an acid component (e.g., a super acid) provide better rates of SSP IV lift than do catalyst systems that are devoid of a strong acid component. Example 1, for instance, achieves a rate of SSP IV lift that is over 100 percent greater than that of Comparative Examples 11-12.

Surprisingly, the increase in solid state polymerization efficiency seems to be independent of the coordination and supplemental catalysts used during the melt phase polymerization. Accordingly, employing strong acids during solid state polymerization would appear to be capable of boosting the performance of solid state polymerization for most metal-containing catalyst systems.

In accordance with the present invention, the acid component of the catalyst system may be introduced into the polyethylene terephthalate prepolymers and polymers directly (e.g., as a powder or liquid) or as a concentrate in an inert or reactive carrier.

As discussed previously, the catalyst system may be introduced into the polyethylene terephthalate prepolymers prior to melt phase polycondensation. Alternatively, the acid component of the catalyst system may be introduced into the polyethylene terephthalate polymers during melt phase polycondensation, typically after the polymer melt achieves an intrinsic viscosity of at least about 0.45 dL/g (e.g., an intrinsic viscosity of between about 0.45 and 0.60 dL/g). In some instances, the acid component of the catalyst system is introduced after the polymer melt achieves an intrinsic viscosity of at least about 0.60 dL/g. Of course, when the acid component is introduced during melt phase polycondensation, the melt polycondensation of the polyethylene terephthalate polymers is then completed. Finally, the acid component of the catalyst system may also be introduced into the polyethylene terephthalate polymers after melt phase polycondensation is complete.

With respect to the polymerization process according to the present invention, a convenient point of acid component addition is after melt phase polycondensation is complete or essentially complete (e.g., the acid can be mixed with the molten polymer stream after the final polymerization vessel). Late addition can be achieved, for example, through the use of an extruder, the use of a carrier, or both.

In this regard, an extruder may be employed to facilitate catalyst addition to polyethylene terephthalate polymers, particularly where polyethylene terephthalate polymers are in the form of resin flakes or pellets. For example, pelletized polyethylene terephthalate polymers and the acid component (e.g., liquid or solid) can be introduced at—typically into—an extruder.

As used herein, the concept of combining (or introducing, adding, etc.) the polyethylene terephthalate polymers and one or more catalyst system components at an extruder embraces (1) introducing both the polyethylene terephthalate polymers and a catalyst system component into the extruder; (2) introducing a catalyst system component into the polyethylene terephthalate polymers before the extruder, and then mixing the polyethylene terephthalate polymers and the catalyst system component within the extruder; and (3) introducing a catalyst system component into the polyethylene terephthalate polymers after the extruder (i.e., while the polymers in the form of a polymer melt). Although introducing a catalyst system component at an extruder may hinder productivity at larger-scale operations, the use of an extruder enables quick formulation changes and may be convenient, especially for smaller-scale operations.

More specifically, commonly assigned U.S. Pat. No. 6,599,596 discloses a method for the late introduction of additives into a process for making polyethylene terephthalate. The additives are introduced during, and typically after, the polycondensation of polyethylene terephthalate polymers. In particular, the method employs a reactive carrier that not only functions as a delivery vehicle for one or more additives (e.g., the acid component), but also reacts with the polyethylene terephthalate. Moreover, U.S. Pat. No. 6,599,596 discloses that this may be achieved using a simplified additive delivery system that does not require the use of an extruder. In comparison, commonly assigned U.S. Pat. No. 6,569,991 for Methods of Post-Polymerization Extruder Injection in Polyethylene Terephthalate Production, which is a continuation-in-part of U.S. Pat. No. 6,599,596, discloses a method for late additive introduction at an extruder during a process for making polyethylene terephthalate. As noted, each of these patents is incorporated by reference in its entirety.

Late introduction of the acid component is facilitated by the post-polymerization injection methods disclosed in U.S. Pat. Nos. 6,599,596 and 6,569,991 (i.e., acid introduction via a reactive carrier, rather than via an inert carrier or no carrier at all). The reactive carrier, which typically has a molecular weight of more than about 200 g/mol and less than about 10,000 g/mol (e.g., 300-10,000 g/mol) may be introduced during melt phase polycondensation, or more typically, after the melt phase polycondensation is complete. In either respect, the reactive carrier should be introduced to the polyethylene terephthalate polymers in quantities such that bulk polymer properties are not significantly affected.

As noted, polyethylene terephthalate macromolecules are considered to be high polymers at an intrinsic viscosity of about 0.45 dL/g (i.e., a molecular weight of at least about 13,000 g/mol). In contrast, the reactive carriers according to the present invention are non-polymeric, having molecular weights that are more than about 200 g/mol and less than about 10,000 g/mol. The molecular weight of the reactive carrier is typically less than 6,000 g/mol, typically less than 4,000 g/mol, more typically between about 300 and 2,000 g/mol, and most typically between about 400 and 1,000 g/mol. As used herein, molecular weight refers to number-average molecular weight, rather than weight-average molecular weight.

terephthalate polymers during solid state polymerization and that will not cause the polyethylene terephthalate polymers to suffer intrinsic viscosity loss during injection molding processes.

Table 7 (below) provides experimental results for polyethylene terephthalate polymers that are polymerized in the solid phase—with and without a strong acid (i.e., DBSA). In particular, bottle-grade polyethylene terephthalate resin chips having an intrinsic viscosity of about 0.62 dL/g were extruded at 280° C. in a twin screw extruder. The polyester resin of Example 36 was extruded with 1,000 ppm of DBSA (based on the weight of the polyester chips). The DBSA was diluted in an equal amount of reactive liquid carrier, namely polyethylene glycol having an average molecular weight of 400 g/mol (i.e., PEG400), then the DBSA/PEG400 blend was pumped into the extruder feed throat. In contrast, the polyester resin of Comparative Example 37 was extruded without the DBSA:

TABLE 7

| Ex. | acid | ppm | (° C.) | start IV (dL/g) | 5-hr end IV (dL/g) | 5-hr IV lift (dL/g) | 10-hr end IV (dL/g) | 10-hr IV lift (dL/g) |
|---|---|---|---|---|---|---|---|---|
| 36 | DBSA | 1000 | 210 | 0.510 | 0.761 | 0.251 | 0.889 | 0.379 |
| 37 | — | — | 210 | 0.586 | 0.701 | 0.115 | 0.787 | 0.201 |

As a general matter, the reactive carrier should make up no more than about one weight percent of the polyethylene terephthalate resin. Typically, the reactive carrier is introduced to the polyethylene terephthalate polymers in quantities such that its concentration in the polymer resin is less than about 1,000 ppm (i.e., 0.1 weight percent). Reducing the reactive carrier to quantities such that its concentration in the polymer resin is less than 500 ppm (i.e., 0.05 weight percent) will further reduce potential adverse effects to bulk polymer properties.

In one exemplary embodiment, the reactive carrier has a melting point that ensures that it is a liquid or slurry at about 100° C. In another exemplary embodiment, the reactive carrier has a melting point that ensures that it is a liquid or slurry at near ambient temperatures. Near ambient temperatures not only simplify the unit operations (e.g., extruders, heaters, and piping), but also minimize degradation of the inert particulate additives. As used herein, the term "near ambient" includes temperatures between about 20° C. and 60° C.

In general, reactive carriers having carboxyl, hydroxyl, or amine functional groups are favored. Preferred are polyols, especially polyester polyols and polyether polyols, having a molecular weight that is sufficiently high such that the polyol will not substantially reduce the intrinsic viscosity of the polyethylene terephthalate polymer, and a viscosity that facilitates pumping of the polyol. Polyethylene glycol is a preferred polyol. Other exemplary polyols include functional polyethers, such as polypropylene glycol that is prepared from propylene oxide, random and block copolymers of ethylene oxide and propylene oxide, and polytetramethylene glycol that is derived from the polymerization of tetrahydrofuran.

Alternatively, the reactive carrier may include dimer or trimer acids and anhydrides. In another embodiment, the reactive carrier may possess, in addition to or in place of terminal functional groups, internal functional groups (e.g., esters, amides, and anhydrides) that react with the polyethylene terephthalate polymers. In yet another embodiment, the reactive carrier may include non-functional esters, amides, or anhydrides that are capable of reacting into the polyethylene Table 7 shows that after both five and ten hours of solid state polymerization under vacuum at 210° C., the acid-enhanced polyester resin (Example 36) demonstrated superior SSP IV lift as compared with the unenhanced polyester resin (Example 37).

Moreover, the acid catalyst DBSA is a liquid at 25° C., thereby simplifying its introduction into polyethylene terephthalate polymers after melt phase polycondensation (e.g., extruder-based unit operations).

Examples 36 and 37 illustrate how the SSP catalysts according to the present invention can be added to polyester during extrusion of recovered polyethylene terephthalate polyester prior to subsequent solid state polymerization. In this way, this aspect of the present invention provides a cost-effective way to upgrade recycled polyethylene terephthalate polyester for various applications, such as containers, trays, and strapping.

The following commonly assigned patents and publication disclose further aspects of late addition that are useful with respect to the present invention: U.S. Pat. No. 6,573,359 for Methods of Post-Polymerization Injection in Condensation Polymer Production; U.S. Pat. No. 6,590,069 for Methods of Post-Polymerization Extruder Injection in Condensation Polymer Production; U.S. Pat. No. 6,803,082 for Methods for the Late Introduction of Additives into Polyethylene Terephthalate; and Publication No. 2005/0170175 A1, published Aug. 4, 2005, as Methods for Introducing Additives into Polyethylene Terephthalate. As noted, each of these patents and publication is incorporated by reference in its entirety.

The inclusion of coordination catalysts and supplemental catalysts, if any, in the present catalyst system increases the rate of melt polycondensation and, hence, the production of the polyethylene terephthalate resins. These catalysts, however, may eventually degrade the polyethylene terephthalate polymer. For example, polymer degradation may include discoloration (e.g., yellowing), acetaldehyde formation, or molecular weight reduction. To reduce these undesirable effects, stabilizing compounds can be employed to sequester ("cool") coordination and supplemental catalysts. The most commonly used stabilizers contain phosphorus, typically in the form of phosphates and phosphites.

In some embodiments of the present invention, therefore, it may be desirable to include a stabilizer, such as a phosphorus stabilizer. Accordingly, a phosphorus stabilizer may be introduced into the polyethylene terephthalate polymers such that the phosphorus is present in the resulting polyester resin, on an elemental basis, in an amount less than about 100 ppm, typically in an amount less than about 60 ppm, and more typically in an amount between about 2 and 40 ppm (e.g., between about 5 and 15 ppm). In one exemplary embodiment, the phosphorus is present in the resulting polyester resin in an amount less than about 10 ppm (i.e., between about 2 and 10 ppm). In another exemplary embodiment, the phosphorus is present in the resulting polyester resin in an amount greater than about 15 ppm (e.g., between about 20 and 50 ppm). The phosphorus stabilizer may be introduced at any time, but it is typically added after esterification or transesterification (e.g., during and/or after melt phase polycondensation is essentially complete).

Those having ordinary skill in the art will appreciate that if added to deactivate one or more melt-phase polycondensation catalysts (i.e., the coordination and/or supplemental catalysts), phosphorus must be introduced in sufficient amounts to achieve that objective. Phosphorus in excess of the amount required to deactivate polymerization catalysts (e.g., more than about 60 ppm and perhaps even more than 100 ppm, such as 150 ppm) might be unnecessary but not especially detrimental to the resulting polyethylene terephthalate resin.

In this regard, stabilizers may be introduced according to commonly assigned U.S. Pat. No. 5,898,058 for a Method of Post-Polymerization Stabilization of High Activity Catalysts in Continuous Polyethylene Terephthalate Production. U.S. Pat. No. 5,898,058 discloses a method of stabilizing high activity polymerization catalysts in continuous polyethylene terephthalate production, typically at or after the end of the polymerization reaction and before polymer processing to deactivate the polymerization catalyst and increase the throughput of the polyester without adversely affecting the thermal stability of the polyethylene terephthalate polyester.

Alternatively, stabilizers may be introduced according to the above-referenced, commonly assigned U.S. Pat. Nos. 6,599,596; 6,569,991; 6,573,359; 6,590,069; and 6,803,082.

As noted, the two main processes for making polyethylene terephthalate (i.e., ester interchange and direct esterification) each (i) react a terephthalate component and a diol component (i.e., a terephthalate moiety and a diol moiety) to form polyethylene terephthalate prepolymers and (ii) then polymerize the prepolymers (i.e., melt phase polycondensation and/or solid state polymerization) to form polyethylene terephthalate polymers.

Those having ordinary skill in the art will appreciate that most commercial polyethylene terephthalate polymers are, in fact, modified polyethylene terephthalate polyesters. Accordingly, the reaction of the terephthalate moiety and the diol moiety typically yields polyethylene terephthalate prepolymers having at least some comonomer substitution, most often between about 2 and 12 mole percent comonomer substitution (e.g. 3 and 8 mole percent comonomer substitution).

Polyethylene terephthalate polyester may be produced in a batch process in which the product of the ester interchange or esterification reaction is formed in one vessel and then transferred to a second, agitated vessel for polymerization (i.e., melt phase polycondensation). Generally, the polycondensation reaction continues in the second vessel until the power used by the agitator indicates that the polyester melt has achieved the desired intrinsic viscosity and, thus, the desired molecular weight. It is more commercially practicable, however, to carry out the esterification or ester interchange reactions, and then the polymerization reaction as a continuous process. The continuous production of polyethylene terephthalate results in greater throughput, and so is more typical in large-scale manufacturing facilities.

In an exemplary process according to the present invention, a continuous feed of terephthalic acid and excess ethylene glycol enters a direct esterification vessel. The esterification vessel is operated at a temperature of between about 240° C. and 290° C. (e.g., 260° C.) and at a pressure of between about 5 and 85 psia (e.g., atmospheric pressure) for between about one and five hours. The esterification reaction forms low molecular weight monomers, oligomers, and water. The water is removed as the reaction proceeds to provide favorable reaction equilibrium.

The molar ratio of ethylene glycol to terephthalic acid is typically more than 1.0 and less than about 1.6 (e.g., 1.05-1.5), more typically less than 1.4 (e.g., 1.15-1.3), and most typically less than 1.3 (e.g., 1.1-1.2). Higher fractions of excess ethylene glycol (e.g., a molar ratio of about 1.15 to 1.3) help reduce the acidity of the esterification product (i.e., the carboxyl and group concentration of the polyethylene terephthalate prepolymers that are obtained during esterification) but tend to promote the formation of diethylene glycol. As a practical matter, therefore, mole ratios are typically capped.

Those having ordinary skill in the art will understand that rather than using a single esterification vessel, exemplary processes may employ two or more direct esterification vessels, such as a primary esterifier and a secondary esterifier. In an exemplary configuration employing two esterifiers in series, the primary esterifier will typically produce polyethylene terephthalate monomers, dimers, trimers, and such (i.e., oligomers), which are then fed directly to the secondary esterifier. Esterification within the secondary esterifier continues to yield polyethylene terephthalate prepolymers having an average degree of polymerization between about 6 and 14 (e.g., about 8-12).

Thereafter, the low molecular weight monomers and oligomers are polymerized via melt phase polycondensation in the presence of one or more coordination catalysts (e.g., titanium, antimony, germanium, and/or aluminum) and, optionally, one or more supplemental catalysts (e.g., cobalt, manganese, and zinc) to form polyethylene terephthalate polyester. The resulting polyethylene terephthalate polyester possesses an elemental metal concentration from the coordination catalysts and supplemental catalysts of greater than about $10^{-5}$ mole per mole of polymer repeat units (e.g., about $5 \times 10^{-5}$ mole per mole of polymer repeat units).

For example, an exemplary catalyst system includes 2 and 20 ppm of elemental titanium (e.g., 5-15 ppm of elemental titanium) and between about 10 and 50 ppm of elemental cobalt (e.g. 15 and 40 ppm of elemental cobalt). Titanium, a coordination catalyst, and cobalt, a supplemental catalyst, are typically introduced before melt phase polycondensation (e.g., during esterification). The total concentration of elemental titanium and elemental cobalt present in the resulting polyethylene terephthalate resin is usually greater than about $10^{-4}$ mole per mole of polymer repeat units (e.g. about $1\text{-}2 \times 10^{-4}$ mole per mole of polymer repeat units).

Melt phase polycondensation generally employs a series of two or more vessels (e.g., a low polymerizer then a high polymerizer) and proceeds at a temperature of between about 250° C. and 305° C. for between about one and four hours. The polycondensation reaction usually begins in a first vessel called the low polymerizer. The low polymerizer is operated at a pressure range of less than about 70 torr (e.g., 10-60 mm Hg). In the low polymerizer, the monomers and oligomers polycondense to form polyethylene terephthalate prepolymers and polymers (i.e., the polymer melt), as well as ethylene glycol.

To promote favorable reaction kinetics, ethylene glycol is removed from the polymer melt using an applied vacuum to drive the reaction to completion. In this regard, the polymer melt is typically agitated to drive off ethylene glycol and degradation byproducts. Agitation also helps the highly viscous polymer melt move through the polymerization vessel.

As the polymer melt is fed into successive vessels, the molecular weight and thus the intrinsic viscosity of the polymer melt increases. The temperature of each vessel is generally increased and the pressure decreased to allow greater polymerization in each successive vessel.

The final vessel, generally called the "high polymerizer," is operated at a pressure of between about 0 and 40 torr. Like the low polymerizer, each of the polymerization vessels is connected to a vacuum system having a condenser, and each is typically agitated to facilitate the removal of ethylene glycol and degradation byproducts.

The residence time in the polymerization vessels and the feed rate of the ethylene glycol and terephthalic acid into the continuous process is determined, in part, based on the target molecular weight of the polyethylene terephthalate polyester. Because the molecular weight can be readily determined based on the intrinsic viscosity of the polymer melt, the intrinsic viscosity of the polymer melt is generally used to determine polymerization conditions, such as temperature, pressure, the feed rate of the reactants, and the residence time within the polymerization vessels.

Note that in addition to the formation of polyethylene terephthalate polymers, side reactions occur that produce undesirable byproducts. For example, the esterification of ethylene glycol forms diethylene glycol, which is incorporated into the polymer chain. As is known to those of skill in the art, diethylene glycol lowers the softening point of the resulting polyester resin. Moreover, cyclic oligomers (e.g. trimer and tetramers of terephthalic acid and ethylene glycol) may occur in small amounts. The continued removal of ethylene glycol as it forms in the polycondensation reaction will generally reduce the formation of these byproducts.

After the polymer melt exits the polycondensation stage, typically from the high polymerizer, the acid component of the catalyst system, as well as other additives, may be introduced, such as via a reactive carrier. That is, the polyethylene terephthalate prepolymers are polymerized via a continuous melt phase polycondensation process to form a polyester melt, to which an acid component is introduced.

As noted, the presence of a strong acid promotes efficient solid state polymerization. For example, dodecyl benzene sulfonic acid (DBSA) may be introduced after the polymer melt exits the high polymerizer or, alternatively, directly into the high polymerizer. The DBSA may be included, for example, such that the resulting polyethylene terephthalate resin possesses about 1-4 µmol/g (e.g., about 2-3 µmol/g DBSA). A suitable dodecyl benzene sulfonic acid product is Biosoft S-101 DBSA, which is available from Stepan Chemical Corp. See Tables 3-5 (above).

As noted, the polyethylene terephthalate prepolymers and polymers (i.e., the polymer melt) are typically polymerized via melt phase polycondensation to achieve polyethylene terephthalate polymers having an intrinsic viscosity of at least about 0.60 dL/g (e.g., 0.60-0.70 dL/g). Thereafter, the polymer melt is generally pelletized and crystallized, then polymerized in the solid phase.

Pelletization may be achieved, for instance, by strand pelletization or underwater pelletization. In strand pelletization, the polymer melt is typically filtered and extruded, then quenched, such as by spraying with cold water. The polyethylene terephthalate polyester strand is then cut into chips or pellets for storage and handling purposes.

In underwater pelletization, the polymer melt is likewise filtered but extruded through a die directly into water. The polymer extrudate is separated while immersed in water to form molten droplets. Without being bound to any theory, it is thought that surface tension causes the molten droplet to form spherical pellets (i.e., spheroids). As will be appreciated by those having ordinary skill the art, spherical pellets permit only point contact, thereby minimizing sticking during subsequent unit operations (e.g., crystallization). To facilitate crystallization, pelletization should yield pellets having a stable, cool surface but largely retaining their heat.

As used herein, the term "pellets" is used generally to refer to chips, pellets, and the like. Such polyester pellets typically have an average mass of about 10-25 mg.

Crystallization of pellets is typically achieved by quenching the pellets in hot water (e.g., 80-95° C.) until the pellets achieve at least about 25-30 percent crystallinity. Higher quenching temperatures may be employed if the water is pressurized. After quenching, the pellets might possess surface temperatures between about 130° C. and 170° C. (e.g., 140° C.-160° C.) as measured by infrared measuring device. This kind of hot-water crystallization, for example, may further include subsequent drying operations. Such drying unit operations (e.g., flash drying to remove surface moisture) are well within the understanding of those having ordinary skill in the art.

Satisfactory techniques for underwater pelletization and thermal crystallization are disclosed in U.S. Patent Application Publication No. US2005/0085620 A1 (Bruckmann), which is hereby incorporated by reference in its entirety. Alternatively, crystallization can be achieved, for instance, via hot-air crystallization, fluidized-bed crystallization, or mechanically agitated crystallization. See e.g., U.S. Pat. Nos. 4,370,302; 5,410,984; 5,440,005; 5,454,344; 5,497,562; 5,523,064; 5,532,335; 5,634,282; and 5,662,870; 5,711,089; 6,713,600; and 6,767,520. Each of these U.S. patents is hereby incorporated by reference in its entirety.

The crystallized pellets are subjected to further polycondensation in the solid phase to increase the molecular weight of the polyethylene terephthalate resin. Solid state polymerization proceeds at between about 190° C. and 220° C. for several hours (e.g., about 6-18 hours). To reduce yellowing and the production of unwanted byproducts, solid state polycondensation typically proceeds at reduced pressure (e.g. less than 10 torr, perhaps less than 1 torr) under inert conditions (e.g., nitrogen or carbon dioxide).

Although the prior discussion assumes a continuous production process, it will be understood that the invention is not so limited. The teachings disclosed herein may be applied to semi-continuous processes and even batch processes.

As noted, the polyethylene terephthalate resins described herein are typically modified polyethylene terephthalate polyesters (i.e., formed by the reaction of the terephthalate moiety and the diol moiety). In this regard, the modifiers in the terephthalate component and the diol component are typically randomly substituted in the resulting polyester composition.

Polyethylene terephthalate resin formed according to the present invention typically possesses low comonomer substitution. In this regard, the polyethylene terephthalate may include less than about 12 mole percent comonomer substitution (e.g., between about 3 and 8 mole percent). The polyethylene terephthalate typically includes less than 7 mole percent comonomer substitution or more than 2 mole percent comonomer substitution, or both (e.g., between about 4 and 6 mole percent comonomer substitution).

Higher comonomer substitution disrupts crystallization, thereby improving clarity, but heat-setting is enhanced at lower comonomer substitution. Thus, for resins engineered to make hot-fill bottles, the polyethylene terephthalate might include between about 3 and 4 mole percent comonomer substitution. For example, in one such embodiment the modified polyethylene terephthalate is composed of about a 1:1 molar ratio of (1) a diacid component of 2.4 mole percent isophthalic acid with the remainder terephthalic acid, and (2) a diol component of 1.6 mole percent diethylene glycol and the remainder ethylene glycol.

As used herein, the term "comonomer" is intended to include not only monomeric modifiers but also oligomeric modifiers (e.g., polyethylene glycol).

As used herein, the term "diol component" refers primarily to ethylene glycol, but can include other diols besides ethylene glycol (e.g. diethylene glycol; polyalkylene glycols such as polyethylene glycol; 1,3-propane diol; 1,4-butane diol; 1,5-pentanediol; 1,6-hexanediol; propylene glycol; 1,4-cyclohexane dimethanol (CHDM); neopentyl glycol; 2-methyl-1,3-propanediol; 2,2,4,4-tetramethyl-1,3-cyclobutanediol; adamantane-1,3-diol; 3,9-bis(1,1-dimethyl-2-hydroxyethyl)-2,4,8,10-tetraoxaspiro[5.5]undecane; and isosorbide).

The term "terephthalate component" broadly refers to diacids and diesters that can be used to prepare polyethylene terephthalate. In particular, the terephthalate component mostly includes either terephthalic acid or dimethyl terephthalate, but can include diacid and diester comonomers as well. In other words, the "terephthalate component" is either a "diacid component" or a "diester component."

The term "diacid component" refers somewhat more specifically to diacids (e.g., terephthalic acid) that can be used to prepare polyethylene terephthalate via direct esterification. The term "diacid component," however, is intended to embrace relatively minor amounts of diester comonomer (e.g., mostly terephthalic acid and one or more diacid modifiers, but optionally with some diester modifiers, too).

Similarly, the term "diester component" refers somewhat more specifically to diesters (e.g., dimethyl terephthalate) that can be used to prepare polyethylene terephthalate via ester exchange. The term "diester component," however, is intended to embrace relatively minor amounts of diacid comonomer (e.g., mostly dimethyl terephthalate and one or more diester modifiers, but optionally with some diacid modifiers, too).

The terephthalate component, in addition to terephthalic acid or its dialkyl ester (i.e., dimethyl terephthalate), can include modifiers such as isophthalic acid or its dialkyl ester (i.e., dimethyl isophthalate); 2,6-naphthalene dicarboxylic acid or its dialkyl ester (i.e., dimethyl 2,6 naphthalene dicarboxylate); adipic acid or its dialkyl ester (i.e., dimethyl adipate); succinic acid, its dialkyl ester (i.e., dimethyl succinate), or its anhydride (i.e., succinic anhydride); or one or more functional derivatives of terephthalic acid. Other exemplary diacid or diester comonomers modifiers include phthalic acid, phthalic anhydride, biphenyl dicarboxylic acid, cyclohexane dicarboxylic acid, anthracene dicarboxylic acid, adamantane 1,3-dicarboxylic acid, glutaric acid, sebacic acid, and azelaic acid.

In general, diacid comonomer should be employed when the terephthalate component is mostly terephthalic acid (i.e., a diacid component); diester comonomer should be employed when the terephthalate component is mostly dimethyl terephthalate (i.e., a diester component).

For polyethylene terephthalate bottle resins according to the present invention, isophthalic acid and diethylene glycol are exemplary modifiers. Higher levels of comonomer—especially diethylene glycol—tend to suppress crystalline melting peak temperature ($T_M$). Polyethylene terephthalate bottle resins according to the present invention typically include less than about 4 mole percent diethylene glycol.

Those having ordinary skill in the art will appreciate that injection molding operations may run faster using polyester resins that possess lower melting points. Accordingly, higher comonomer content may be desirable to achieve polyester resins that deliver faster cycle times during injection molding. Those having ordinary skill in the art will appreciate that, as a modifier, cyclohexane dimethanol efficiently suppresses polymer crystallinity but has poor oxygen permeability properties.

For polyethylene terephthalate fiber resins according to the present invention, no comonomer substitution is necessary, but where employed, typically includes diethylene glycol or polyethylene glycol.

As noted, to achieve the polyester composition of the present invention a molar excess of the diol component may be reacted with the terephthalate component (i.e., the diol component is present in excess of stoichiometric proportions).

In reacting a diacid component and a diol component via a direct esterification reaction, the molar ratio of the diacid component and the diol component is typically between about 1.0:1.0 and 1.0:1.6. Alternatively, in reacting a diester component and a diol component via an ester interchange reaction, the molar ratio of the diester component and the diol component is typically between about 1.0:1.6 and 1.0:2.0.

The diol component usually forms the majority of terminal ends of the polymer chains and so is present in the resulting polyester composition in slightly greater fractions. This is what is meant by the phrases "about a 1:1 molar ratio of a terephthalate component and a diol component," "about a 1:1 molar ratio of a diacid component and a diol component," and "about a 1:1 molar ratio of the diester component and the diol component," each of which may be used to describe the polyester compositions of the present invention.

In accordance with the foregoing, the polyethylene terephthalate resins achieved in accordance with the present catalyst system can be composed of about a 1:1 molar ratio of a diacid component and a diol component. Exemplary diacid components include at least 94 mole percent terephthalic acid (e.g., terephthalic acid and isophthalic acid) and exemplary diol components include at least 94 mole percent ethylene glycol (e.g., ethylene glycol and diethylene glycol).

The reaction of the terephthalate moiety and a diol moiety yields polyethylene terephthalate prepolymers and polymers having less than about 10-12 mole percent comonomer substitution (e.g., less than about 5 mole percent comonomer substitution.)

In view of the foregoing, an exemplary method of making the polyethylene terephthalate resin according to the present invention the present invention includes reacting, in a heated esterification reaction, a diacid moiety that includes at least 90 mole percent terephthalic acid (e.g. 94 mole percent or more) and a diol moiety that includes at least 90 mole percent ethylene glycol (e.g., 94 mole percent or more). Those having ordinary skill in the art will appreciate that the reaction the esterification reaction forms monomers and oligomers of (i) terephthalic acid and, optionally, diacid modifiers, and (ii) ethylene glycol and, optionally, diol modifiers.

For example, the diacid and diol modifiers might be included such that the resulting polyethylene terephthalate polymer has less than about 6 mole percent comonomer substitution. For example, the diacid component may include between about 1.6 and 2.4 mole percent isophthalic acid with the remainder terephthalic acid, and the diol component of includes 1.6 mole percent diethylene glycol and the remainder ethylene glycol.

The alternative exemplary method of making the polyethylene terephthalate resin according to the present invention includes reacting in a transesterification reaction a diester component that includes at least 90 mole percent dimethyl terephthalate (e.g. 94 mole percent or more) and a diol component that includes at least 90 mole percent ethylene glycol (e.g. 94 mole percent or more). Those having ordinary skill in the art will appreciate that the transesterification reaction forms monomers of (i) dimethyl terephthalate and, optionally, diester modifiers, and (ii) ethylene glycol and, optionally, diol modifiers.

In yet another aspect and in accordance with the foregoing, the invention also embraces polyethylene terephthalate resins that are formed via polycondensation reactions employing the present catalyst system. Such resins are suitable not only for preforms, bottles, and other containers, but other articles as well (e.g., fibers, films, and 1+ millimeter sheets).

The polyethylene terephthalate resin according to the present invention generally possesses an intrinsic viscosity of more than about 0.68 dL/g. Those having ordinary skill in the art will appreciate, however, that during injection molding operations polyester resins tend to lose intrinsic viscosity (e.g. an intrinsic viscosity loss of about 0.02-0.06 dL/g from chip to preform).

The polyethylene terephthalate resin has an exemplary intrinsic viscosity of less than about 1.0 dl/g, such as more than about 0.70 dL/g or less than about 0.90 dL/g, or both (i.e., between about 0.70 dL/g and 0.90 dL/g). The polyethylene terephthalate may have an intrinsic viscosity of more than about 0.72 dL/g or less than about 0.78 dL/g, or both (i.e., between about 0.72 dL/g and 0.78 dL/g). Alternatively, the polyethylene terephthalate may have an intrinsic viscosity of more than about 0.78 dL/g (e.g. 0.81 dL/g) or less than about 0.86 dL/g (e.g. 0.84 dL/g), or both (i.e., between about 0.78 dL/g and 0.86 dL/g). The polyethylene terephthalate resin according to the present invention generally possesses an intrinsic viscosity of less than about 0.86 dL/g.

For preforms used to make hot-fill bottles, heat-setting performance diminishes at higher intrinsic viscosity levels and mechanical properties (e.g. stress cracking, drop impact, and creep) decrease at lower intrinsic viscosity levels (e.g. less than 0.6 dL/g).

For polyester resins that are capable of forming high-clarity, hot-fill preforms and bottles, the polyethylene terephthalate generally has an intrinsic viscosity of less than about 0.86 dL/g, such as between about 0.72 dL/g and 0.84 dL/g. For example, the polyethylene terephthalate may have an intrinsic viscosity of more than about 0.68 dL/g or less than about 0.80 dL/g, or both (i.e., between about 0.68 dL/g and 0.80 dL/g). Typically, the polyethylene terephthalate has an intrinsic viscosity of more than about 0.75 dL/g as well (i.e., between about 0.75 dL/g and 0.78 dL/g or, more likely, between about 0.78 dL/g and 0.82 dL/g). For preforms used to make hot-fill bottles, heat-setting performance diminishes at higher intrinsic viscosity levels and mechanical properties (e.g., stress cracking, drop impact, and creep) decrease at lower intrinsic viscosity levels (e.g., less than 0.6 dL/g).

For polyester resins that are capable of forming high-clarity, carbonated soft drink bottles according to the present invention, the polyethylene terephthalate typically has an intrinsic viscosity of more than about 0.72 dL/g or less than about 0.88 dL/g, or both (i.e., between about 0.72 dL/g and 0.88 dL/g). The polyethylene terephthalate may have an intrinsic viscosity of more than about 0.78 dL/g, such as between about 0.80 dL/g and 0.84 dL/g.

For water bottles and applications that do not demand high strength, the polyethylene terephthalate may have an intrinsic viscosity of more than about 0.72 dL/g or less than about 0.78 dL/g (e.g., 0.74-0.76 dL/g), or both (i.e., between about 0.72 dL/g and 0.78 dL/g).

For polyester fibers, the polyethylene terephthalate typically has an intrinsic viscosity of between about 0.50 dL/g and 0.70 dL/g and typically an intrinsic viscosity between about 0.60 dL/g and 0.65 dL/g (e.g., 0.62 dL/g).

For polyester industrial fibers according to the present invention, the polyethylene terephthalate typically has an intrinsic viscosity of more than about 0.75 dL/g or less than about 0.95 dL/g, or both (i.e., between about 0.75 dL/g and 0.95 dL/g).

For tire cord and extrusion-blow molding applications the polyethylene terephthalate may require an intrinsic viscosity of more than about 0.9 dL/g (e.g., 1.0-1.2 dL/g).

In accordance with the foregoing, polyethylene terephthalate resins according to the present invention may be formed into exemplary articles that include, without limitation, sheets, films, trays, fibers, tire cord, preforms, containers, and bottles. As will be recognized by those having ordinary skill in the art, many other articles may be formed from the solid state polymerized polyethylene terephthalate resins according to the present invention.

That said, a typical application for the polyethylene terephthalate resins of the present invention is the manufacture of injection-molding preforms and stretch-blow molding bottles. In this regard, after solid state polymerization, the polyester chips may be re-melted and re-extruded to form bottle preforms, which can thereafter be formed into polyester containers (e.g., beverage bottles). Exemplary bottles formed from the resins and preforms described herein have sidewall haze of less than about 15 percent, more typically less than about 10 percent.

As will be understood by those having ordinary skill in the art, polyethylene terephthalate is typically converted into a container via a two-step process. First, an amorphous bottle preform (e.g., less than about 4 percent crystallinity and typically between about 4 and 7 mm in thickness) is produced from bottle resin by melting the resin in an extruder and injection molding the molten polyester into a preform. Such a preform usually has an outside surface area that is at least an order of magnitude smaller than the outside surface of the final container. The preform is reheated to an orientation temperature that is typically 30° C. above the glass transition temperature ($T_g$).

The reheated preform may then be placed into a bottle blow mold and, by stretching and inflating with high-pressure air, formed into a heated bottle. The blow mold is maintained at a temperature between about 115° C. and 200° C., usually between about 120° C. and 160° C. Those having ordinary skill in the art will recognize that the introduction of compressed air into the heated preform effects formation of the heated bottle. Thus, in one variation, the compressed air is turbulently released from the bottle by the balayage technique to facilitate cooling of the heated bottle.

Those of ordinary skill in the art will understand that any defect in the preform is typically transferred to the bottle. Accordingly, the quality of the bottle resin used to form injection-molded preforms is critical to achieving commercially acceptable bottles. Aspects of injection-molding preforms and stretch-blow molding bottles are discussed in U.S. Pat. No. 6,309,718 for Large Polyester Containers and Method for Making the Same, which is hereby incorporated entirely herein by reference.

Those having ordinary skill in the art understand that polyethylene terephthalate resins that are used in forming food packaging (e.g., films and bottles) must possess excellent color (i.e., not too yellow).

Color differences are commonly classified according to the L*a*b* color space of the Commission Internationale l'Eclairage (CIE). The three components of this system consist of L*, which describes luminosity on a scale of 0-100 (i.e., 0 is black and 100 is white), a*, which describes the red-green axis (i.e., positive values are red and negative values are green), and b*, which describes the yellow-blue axis (i.e., positive values are yellow and negative values are blue). For characterizing polyester resins, L* and b* values are of particular interest.

In this regard, it is preferred that polyester color be measured after polymerization in the solid phase. After solid state polymerization, the polyethylene terephthalate resin of the present invention possesses an L* value (i.e., luminosity) of more than about 70, typically more than about 75 (e.g., 77), and most typically more than about 80 as classified in the CIE L*a*b* color space. In addition, the polyethylene terephthalate resin typically possesses a b* color value of less than about 2—more typically less than about 0—as classified by the CIE L*a*b* color space. Most typically, the polyethylene terephthalate resin possesses a b* color value of between about −3 and 2 as classified by the CIE L*a*b* color space.

Those having ordinary skill in the art will appreciate that elevated concentrations of the coordination catalyst component can cause the polyethylene terephthalate resin to appear yellowish. By way of example, it has been observed that employing titanium as the coordination catalyst component such that the resulting polyethylene terephthalate resin includes between about 2 and 20 ppm of elemental titanium (e.g., 5-15 ppm) can yield polyethylene terephthalate polymers that, after melt phase polycondensation and/or solid state polymerization, possess a b* value less than about 4 (e.g., less than about 2).

Those having ordinary skill in the art will appreciate that although color can be measured in polyester preforms and polyester bottles, color is often more conveniently measured in polyester pellets or polyester plaques. (As set forth herein, the term "pellets" is used generally to refer to chips, pellets, and the like.)

Those having ordinary skill in the art will know that polyethylene terephthalate resins are typically formed into pellets before undergoing crystallization and solid state polymerization. As a result, after solid state polymerization but prior to polymer processing (e.g., injection molding), the polyethylene terephthalate resins of the present invention are crystalline pellets; it is preferred that color be measured in that form. In this regard and unless otherwise indicated (e.g., such as with respect to non-crystalline plaques), the CIE L*a*b* color space values reported herein for the polyethylene terephthalate resins of the present invention relate to crystalline polyethylene terephthalate pellets.

As described herein, the polyethylene terephthalate resin of the present invention can be injection molded into preforms, which in turn may be blow molded into bottles. Measuring color in preforms and bottles, however, can be awkward. Consequently, it is preferred that preforms and bottles be formed into plaques to facilitate comparative color measurements. In this regard, the polyethylene terephthalate preforms and bottles according to the present invention may be ground, melted at 280° C., and then injected into a cold mold to form standard, three millimeter (3 mm) non-crystalline polyester test plaques.

As these standard test plaques are formed from either polyester preforms or polyester bottles, the constituent polyesters may possess unfavorable heat histories. Those having ordinary skill in the art will appreciate that this may somewhat degrade the constituent polyesters. In this regard, it is believed that injection molding preforms from the crystalline polyethylene terephthalate pellets of the present invention (and thereafter forming standard test plaques) can introduce some yellowing (i.e., the b* color value increases slightly).

Accordingly, the polyethylene terephthalate preforms and bottles of the present invention typically possess a b* color value of less than about 4—more typically less than about 2 (e.g., less than about 0)—as classified by the CIE L*a*b* color space. Most typically, the polyethylene terephthalate preforms and bottles possess a b* color value of between about −3 and 3 as classified by the CIE L*a*b* color space.

Like the aforementioned crystalline polyethylene terephthalate pellets, however, the polyethylene terephthalate preforms and bottles of the present invention possess an L* value of more than about 70, typically more than about 75 (e.g. 77), and most typically more than about 80 (e.g., 83 or more) as classified in the CIE L*a*b* color space.

As noted, these CIE L*a*b* color space values for preforms and bottles refer to measurements from standard, non-crystalline polyester test plaques.

CIE L*a*b* color space values for the three-millimeter, non-crystalline polyethylene terephthalate test plaques were determined using a HunterLab LabScan XE spectrophotometer (illuminant/observer: D65/10°; diffuse 8° standard; transmittance port). Those having ordinary skill in the art will appreciate that non-crystalline polyester plaques are essentially transparent and so are measured by transmittance. In this regard, test procedures (e.g., standards and calibrations) appropriate for measuring color properties of non-crystalline polyester in various forms are readily available to and within the understanding of those having ordinary skill in the art.

Where the polyethylene terephthalate resin is intended for packaging (e.g., polyester preforms and bottles), it may include a heat-up rate additive. In this regard, the heat-up rate additive is present in the resin in an amount sufficient to improve the resin's reheating profile and improve blow molding performance and bottle properties, such as shrinkage. As will be understood by those having ordinary skill in the art, a heat-up rate additive helps preforms absorb energy during preform reheating processes. In reheating preforms, the inside of the preform should be at least as warm as the outside of the preform as the inside undergoes more stretching during blow molding.

In one embodiment, the heat-up rate additive is a carbon-based heat-up rate additive. Carbon-based heat-up rate additive is typically present in the polyethylene terephthalate resin in an amount less than about 25 ppm. More typically, carbon-based heat-up rate additive is present in the polyethylene terephthalate resin in an amount between about 4 and 16 ppm (e.g. 8-12 ppm), most typically in an amount between about 6 and 10 ppm. Suitable carbon-based additives include carbon black, activated carbon, and graphite. For example, satisfactory carbon black heat-up rate additives are disclosed in U.S. Pat. No. 4,408,004 (Pengilly), which is hereby incorporated entirely by reference.

In another embodiment, the heat-up rate additive may be a metal-containing heat-up rate additive. Metal-containing heat-up rate additives can be present in the polyethylene terephthalate resin in an amount between about 10 and 300 ppm, more typically in an amount greater than about 75 ppm (e.g., between about 150 and 250 ppm). Suitable metal containing heat-up rate additives include metals, metal oxides, minerals (e.g., copper chromite spinels), and dyes. For example, satisfactory inorganic black pigments and particles are disclosed in U.S. Pat. No. 6,503,586 (Wu), which is hereby incorporated entirely by reference.

Exemplary metal-containing heat-up rate additives are tungsten-based additives, such as tungsten metal or tungsten carbide. In this regard, tungsten-containing heat-up rate additive powders typically have an average particle size of between about 0.7 and 5.0 microns, more typically between about 0.9 and 2.0 microns.

As will be understood by those familiar with this art, particle size is typically measured by techniques based on light scattering. Particle sizes and distributions are often characterized according to ASTM B330-2 ("Standard Test Method for Fisher Number of Metal Powders and Related Compounds").

Other exemplary metal-containing heat-up rate additives are molybdenum-based additives, especially molybdenum sulfide ($MoS_2$). In this regard, molybdenum sulfide has outstanding heat absorption properties, so it can be included in somewhat lesser quantities (e.g., 5-100 ppm) as compared with other metal-containing heat-up rate additives.

Additional exemplary heat-up rate additives are natural spinels and synthetic spinels. Spinels may be included in the polyethylene terephthalate resin in an amount between about 10 and 100 ppm (e.g., between about 15 and 25 ppm). Particularly outstanding spinel pigments are copper chromite black spinel and chrome iron nickel black spinel.

These spinels are disclosed in commonly assigned U.S. patent application Ser. No. 09/247,355, for Thermoplastic Polymers with Improved Infrared Reheat Properties, filed Feb. 10, 1999, now abandoned, and its divisions: U.S. patent application Ser. No. 09/973,499, published as U.S. Patent Publication 2002/0011694 A1 on Jan. 31, 2002; U.S. patent application Ser. No. 09/973,520, published as U.S. Patent Publication 2002-0027314 A1 on Mar. 7, 2002: and U.S. patent application Ser. No. 09/973,436, published as U.S. Patent Publication 2002-0033560 A1 on Mar. 21, 2002. Each of these patent applications and patent publications is hereby incorporated entirely by reference.

The heat-up rate of a polyethylene terephthalate preform can be described by surface temperature measurements at a fixed location on a preform for a particular bottle production rate.

In polyethylene terephthalate bottle production, polyethylene terephthalate bottle preforms are typically reheated by passing the preforms through a reheat oven of a blow molding machine. The reheat oven consists of a bank of quartz lamps (3,000 and 2,500 watt lamps) that emit radiation mostly in the infrared range. The ability of the preform to absorb this radiation and convert it into heat, thereby allowing the preform to reach the orientation temperature for blow molding, is important for optimum bottle performance and efficient production. Important bottle properties for bottle performance are material distribution, orientation, and sidewall crystallinity.

Preform reheat temperature is important for control of these properties. Depending on the kind of bottle being produced, the preform reheat temperature is typically in the range of 30-50° C. above the glass transition temperature ($T_g$) of polyethylene terephthalate. The reheat temperature depends on the application (e.g., hot-filled beverage bottle or carbonated soft drink bottles). The rate at which a preform can be reheated to the orientation temperature is important for optimal bottle performance in high-speed, polyethylene terephthalate blow-molding machines, such as those manufactured by Sidel, Inc. (LeHavre, France). This is especially true for heat-set bottles that are intended for filling with hot liquids in excess of 185° F. In heat-set bottle production, the preform is reheated rapidly to as high a temperature as possible. This maximizes crystallization upon blow molding and avoids thermal crystallization in the preform. Those having ordinary skill in the art will appreciate that such thermal crystallization can cause unacceptable haze because of spherulitic crystallization.

Those of ordinary skill in the art will further appreciate that branching agents may be included in small amounts (e.g., less than about 2,000 ppm) to increase polymerization rates and improve bottle-making processes. Chain branching agents can be introduced, for example, during esterification or melt phase polymerization. Typically, less than 0.1 mole percent branching agent is included in the polyethylene terephthalate resins of the present invention.

In this regard, U.S. Provisional Patent Application Ser. No. 60/739,498, for Polyester Resins for High-Efficiency Injection Molding, filed Nov. 23, 2005, and International Patent Application No. PCT/US06/61187 for Polyester Resins for High-Efficiency Injection Molding, filed Nov. 22, 2006 (and published May 31, 2007, as Publication No. WO 2007/062384) each disclose the inclusion of branching agents in amounts sufficient to increase polymerization rates and improve bottle-making processes. As noted, these commonly assigned applications are incorporated entirely by reference.

As used herein, the term "branching agent" refers to a multifunctional monomer that promotes the formation of side branches of linked monomer molecules along the main polymer chain. See Odian, Principles of Polymerization, pp. 18-20 (Second Edition 1981). The chain branching agent is typically selected from the group consisting of trifunctional, tetrafunctional, pentafunctional and hexafunctional alcohols or acids that will copolymerize with polyethylene terephthalate. As will be understood by those skilled in the art, a trifunctional branching agent has one reactive site available for branching, a tetrafunctional branching agent has two reactive sites available for branching, a pentafunctional branching agent has three reactive sites available for branching and a hexafunctional branching agent has four reactive sites available for branching.

Acceptable chain branching agents include, but are not limited to, trimesic acid ($C_6H_3(COOH)_3$), pyromellitic acid ($C_6H_2(COOH)_4$), pyromellitic dianhydride, trimellitic acid, trimellitic anhydride, trimethylol propane ($C_2H_5C(CH_2OH)_3$), ditrimethylol propane ($C_2H_5C(CH_2OH)_2C_2H_4OC(CH_2OH)_2C_2H_5$), dipentaerythritol ($CH_2OHC(CH_2OH)_2C_2H_4OC(CH_2OH)_2CH_2OH$), pentaerythritol ($C(CH_2H)_4$), ethoxylated glycerol, ethoxylated pentaerythritol (3EO/4OH and 15 EO/4OH from Aldrich Chemicals), ethoxylated trimethylol propane (2.5EO/OH and 20EO/3OH from Aldrich Chemicals), and Lutrol HF-1 (an ethoxylated glycerol from BASF).

Exemplary aromatic chain branching agents—aromatic rings appear to curb stress nucleation—include trimellitic acid (TMLA), trimellitic anhydride (TMA), pyromellitic acid (PMLA), pyromellitic dianhydride (PMDA), benzophenone tetracarboxylic acid, benzophenone tetracarboxylic dianhydride, naphthalene tetracarboxylic acid, and naphthalene tetracarboxylic dianhydride, as well as their derivatives.

In addition to heat-up rate additives and chain branching agents, other additives can be incorporated—either directly or via carrier—into the polyethylene terephthalate resins of the present invention Such additives include catalyst stabilizers, friction-reducing additives (e.g., talc or calcium carbonate), UV absorbers, inert particulate additives (e.g., clays or silicas), colorants, antioxidants, oxygen barrier agents, carbon dioxide barrier agents, oxygen scavengers, flame retardants, crystallization control agents, acetaldehyde reducing agents, impact modifiers, catalyst deactivators, melt strength enhancers, anti-static agents, lubricants, chain extenders, nucleating agents, solvents, fillers, and plasticizers.

Late addition is especially desirable where the additives are volatile or subject to thermal degradation. Conventional additive injection during esterification or early during the polycondensation stage subjects additives to several hours of high-temperature (greater than 260° C.) and reduced-pressure (less than 10 torr) conditions. Consequently, additives that have significant vapor pressure at these conditions could be lost from the process. Advantageously, late addition via reactive carrier significantly reduces the time additives are exposed to high polycondensation.

It will be apparent to those of ordinary skill in the polymer arts that the present invention embraces not only to the introduction of a catalyst system into polyethylene terephthalate, but also to the introduction of the catalyst system into any condensation polymer that possesses carbonyl functionality along its polymer chain. It is expected that the foregoing exemplary description of the invention using a preferred condensation polymer (i.e., polyethylene terephthalate) will enable those skilled in the polymer arts to practice, without undue experimentation, the invention for any condensation polymer having carbonyl functionality. In this regard, those having ordinary skill in the polymer arts will recognize that there are numerous kinds of condensation polymers and copolymers that can be synthesized without departing from the scope and spirit of the present invention.

As used herein, the term "carbonyl functionality" refers to a carbon-oxygen double bond that is an available reaction site. Condensation polymers having carbonyl functionality are typically characterized by the presence of a carbonyl functional group (i.e., C=O) with at least one adjacent hetero atom (e.g., an oxygen atom, a nitrogen atom, or a sulfur atom) functioning as a linkage within the polymer chain. Accordingly, "carbonyl functionality" is meant to embrace various functional groups including, without limitation, esters, amides, imides, carbonates, and urethanes.

Possible polycondensation polymers according to the present invention may include, without limitation, polyesters, polyurethanes, polycarbonates, polyamides, and polyimides. Polyesters, such as polyethylene terephthalate, polytrimethylene terephthalate, polybutylene terephthalate, are preferred.

As will be understood by those of ordinary skill in the art, oligomeric precursors to condensation polymers may be formed by reacting a first polyfunctional component and a second polyfunctional component. For example, oligomeric precursors to polycarbonates may be formed by reacting diols and derivatives of carbonic acid, oligomeric precursors to polyurethanes may be formed by reacting diisocyanates and diols, oligomeric precursors to polyamides may be formed by diacids and diamines and oligomeric precursors to polyimides may be formed by reacting dianhydrides and diamines. As discussed previously, oligomeric precursors to polyesters may be formed by reacting aliphatic or aromatic diols with diacids or diesters. See, e.g., Odian, Principles of Polymerization, (Second Edition 1981). These kinds of reactions are well understood by those of ordinary skill in the polymer arts and will not be further discussed herein.

It will be further understood by those having ordinary skill in the art that certain monomers possessing multi-functionality can self-polymerize to yield condensation polymers. For example, amino acids and nylon salts are each capable of self-polymerizing into polyamides, and hydroxy acids (e.g., lactic acid) can self-polymerize into polyesters (e.g. polylactic acid).

By way of example, it will be understood by those of ordinary skill in the polymer arts that the embodiments of the present invention in which addition of the acid component of the catalyst system occurs after the polycondensation stage or during the polycondensation stage (i.e., where target average degree of polymerization of the condensation polymers is at least about 70) is pertinent to condensation polymers besides polyethylene terephthalate. As noted previously, macromolecules having a degree of polymerization of about 70 are considered high polymers. Accordingly, it may be desirable to allow the melt phase polymerization to achieve "macromolecule" condensation polymers before introducing the acid component of the catalyst system. For example, it may be desirable to add the acid component to condensation polymers possessing an average degree of polymerization greater than about 70 (e.g., 80 or more). In another exemplary embodiment, the acid component is added to condensation polymers possessing an average degree of polymerization greater than about 90 (e.g., 100 or more), such as at the end of melt phase polycondensation.

In another exemplary embodiment, each component of the catalyst system may be introduced into condensation prepolymers prior to melt phase polycondensation.

Alternatively, the coordination catalyst component of the catalyst system may be introduced before the initiation of melt phase polycondensation and the acid component of the catalyst system may be introduced after the initiation of melt phase polycondensation. In this regard, the acid may be introduced into the condensation polymers during melt phase polycondensation, typically after the polymer melt achieves an average degree of polymerization greater than about 70, or after melt phase polycondensation.

In the specification, typical embodiments of the invention have been disclosed. Specific terms have been used only in a generic and descriptive sense, and not for purposes of limitation. Moreover, despite the occasional use herein of the verbiage "and/or," the grammatical use of the disjunctive (i.e., "or") includes the conjunctive (i.e., "and").

The invention claimed is:

1. A method for making polyethylene terephthalate resin, comprising:
   polymerizing polyethylene terephthalate prepolymers via melt phase polycondensation to achieve polyethylene terephthalate polymers having an intrinsic viscosity of at least about 0.45 dL/g;
   introducing a coordination catalyst;
   introducing an acid having a pKa less than about 0 when the reaction melt has a carboxyl end group concentration of more than 50 microequivalents per gram; and
   thereafter solid state polymerizing the polyethylene terephthalate polymers.

2. A method according to claim 1, wherein the coordination catalyst includes one or more of titanium catalysts, germanium catalysts, antimony catalysts, or aluminum catalysts.

3. A method according to claim 1, further comprising the step of introducing a supplemental catalyst in conjunction with the introduction of the coordination catalyst.

4. A method according to claim 3, wherein the supplemental catalyst includes one or more of cobalt catalysts, manganese catalysts, or zinc catalysts.

5. A method according to claim 4, wherein the coordination catalyst and the supplemental catalyst are introduced in amounts sufficient to promote melt phase polycondensation.

6. A method according to claim 1, wherein the acid is introduced to the polyethylene terephthalate polymers after the completion of melt phase condensation polymerization and before initiating solid state polymerization.

7. A method according to claim 1, wherein the acid is introduced to the polyethylene terephthalate polymers at an extruder.

8. A method according to claim 1, wherein the acid has a pKa less than about −2.0.

9. A method according to claim 1, wherein the acid is liquid at near ambient temperatures.

10. A method according to claim 1, wherein the acid comprises one or more acids that are substantially free of a salt form.

11. A method according to claim 1, wherein the solid state polymerization step achieves an improved rate of intrinsic viscosity lift (SSP IV lift) as compared with an otherwise comparable method that employs a catalyst system that is devoid of a strong acid component.

12. A method according to claim 1, wherein the step of solid state polymerizing the polyethylene terephthalate polymers yields polyethylene terephthalate resin, and further comprising the step of forming the polyethylene terephthalate resin into a sheet, a film, a preform, a container, a bottle, a tray, a fiber, or other article.

13. A method for making polyethylene terephthalate resin, comprising:
polymerizing polyethylene terephthalate prepolymers via melt phase polycondensation in the presence of a catalyst system to achieve a polycondensation intermediate having an intrinsic viscosity of at least about 0.40 dL/g, the catalyst system comprising a coordination catalyst, a supplemental catalyst, and an acid having a pKa less than about 0; and
thereafter solid state polymerizing the polycondensation intermediate.

14. A method according to claim 13, wherein the step of polymerizing polyethylene terephthalate prepolymers via melt phase polycondensation yields as the polycondensation intermediate polyethylene terephthalate polymers having an intrinsic viscosity of at least about 0.45 dL/g.

15. A method according to claim 13, wherein the coordination catalyst includes one or more of titanium catalysts, germanium catalysts, antimony catalysts, or aluminum catalysts.

16. A method according to claim 13, wherein the supplemental catalyst includes one or more of cobalt catalysts, manganese catalysts, or zinc catalysts.

17. A method according to claim 13, wherein the acid has a pKa less than about −2.0.

18. A method according to claim 13, wherein the solid state polymerization step achieves an improved rate of intrinsic viscosity lift (SSP IV lift) as compared with an otherwise comparable method that employs a catalyst system that is devoid of a strong acid component.

19. A method for making polyethylene terephthalate resin, comprising:
polymerizing polyethylene terephthalate prepolymers via melt phase polycondensation in the presence of a coordination catalyst to yield polyethylene terephthalate polymers;
thereafter introducing to the polyethylene terephthalate polymers an acid having a pKa less than about 0; and
solid state polymerizing the polyethylene terephthalate polymers.

20. A method according to claim 19, wherein the step of polymerizing polyethylene terephthalate prepolymers comprises polymerizing polyethylene terephthalate prepolymers via melt phase polycondensation to yield polyethylene terephthalate polymers having an intrinsic viscosity of at least about 0.45 dL/g.

21. A method according to claim 19, wherein the coordination catalyst includes one or more of titanium catalysts, germanium catalysts, antimony catalysts, or aluminum catalysts.

22. A method according to claim 19, wherein the step of polymerizing polyethylene terephthalate prepolymers via melt phase polycondensation comprises polymerizing polyethylene terephthalate prepolymers in the presence of a coordination catalyst and a supplemental catalyst.

23. A method according to claim 22, wherein the supplemental catalyst includes one or more of cobalt catalysts, manganese catalysts, or zinc catalysts.

24. A method according to claim 19, wherein the acid is introduced to the polyethylene terephthalate polymers after the completion of melt phase condensation polymerization and before initiating solid state polymerization.

25. A method according to claim 19, wherein the acid is introduced to the polyethylene terephthalate polymers at an extruder.

26. A method according to claim 19, wherein the acid is liquid at near ambient temperatures.

27. A method according to claim 19, wherein the acid has a pKa less than about −2.0.

28. A method according to claim 19, wherein the acid comprises one or more acids that are substantially free of a salt form.

29. A method according to claim 19, wherein the solid state polymerization step achieves an improved rate of intrinsic viscosity lift (SSP IV lift) as compared with an otherwise comparable method that employs a catalyst system that is devoid of a strong acid component.

* * * * *

UNITED STATES PATENT AND TRADEMARK OFFICE
CERTIFICATE OF CORRECTION

| | |
|---|---|
| PATENT NO. | : 7,829,656 B2 |
| APPLICATION NO. | : 12/351245 |
| DATED | : November 9, 2010 |
| INVENTOR(S) | : Carl Steven Nichols et al. |

It is certified that error appears in the above-identified patent and that said Letters Patent is hereby corrected as shown below:

In the Specification

Column 12, Table 3, Example 13 the 10-hour IV (dL/g) measurement reads 0.1356 and should read 0.135

Signed and Sealed this
Twenty-ninth Day of March, 2011

David J. Kappos
*Director of the United States Patent and Trademark Office*